United States Patent [19]
Horiguchi et al.

[11] Patent Number: 6,058,139
[45] Date of Patent: May 2, 2000

[54] CORRELATOR AND SYNCHRONOUS TRACKING APPARATUS USING TIME SHARING OF A RECEIVED SIGNAL IN A SPREAD SPECTRUM RECEIVER

[75] Inventors: Yoshinori Horiguchi; Kazunori Aoyagi, both of Yokohama, Japan

[73] Assignee: Kabushiki Kaisha Toshiba, Japan

[21] Appl. No.: 08/805,644

[22] Filed: Feb. 27, 1997

[30] Foreign Application Priority Data

Feb. 28, 1996 [JP] Japan ................................. 8-041134
Mar. 14, 1996 [JP] Japan ................................. 8-057855

[51] Int. Cl.[7] .................................................. H04B 1/707
[52] U.S. Cl. ............................................ 375/210; 375/367
[58] Field of Search ................................ 375/200, 206, 375/208, 209, 210, 343, 367; 364/728.03, 728.06

[56] References Cited

U.S. PATENT DOCUMENTS

| | | | |
|---|---|---|---|
| 3,947,634 | 3/1976 | Betts | 375/367 |
| 4,527,275 | 7/1985 | Russell | 375/200 |
| 4,675,839 | 6/1987 | Kerr | 364/821 |
| 5,199,050 | 3/1993 | Linsky | 375/367 |
| 5,329,549 | 7/1994 | Kawasaki | 375/200 |
| 5,546,423 | 8/1996 | Sehier et al. | 375/206 |
| 5,548,613 | 8/1996 | Kaku et al. | 375/208 |
| 5,610,940 | 3/1997 | Durrant et al. | 375/208 |
| 5,654,979 | 8/1997 | Levin et al. | 375/206 |

FOREIGN PATENT DOCUMENTS 61-199347  9/1986  Japan.

OTHER PUBLICATIONS

R. Dixon, Tracking 6.2, Spread Spectrum Systems with Commerical Applications, John Wiley & Sons (1994)., pp. 258–261.

*Primary Examiner*—Amanda T. Le
*Attorney, Agent, or Firm*—Finnegan, Henderson, Farabow, Garrett & Dunner, L.L.P.

[57] ABSTRACT

In the synchronous tracking apparatus of a spread spectrum receiver, data obtained by multiplying a receive signal by a pseudo-noise code for receiving is time-shared by differing time-sharing circuits, first and second correlation properties are created which are asymmetrical on both sides with respect to a correlation value axis in which the phase difference between a pseudo-noise code for transmitting contained in the receive signal and a pseudo-noise code for receiving is 0, a delay discriminating property is created by combining these correlation properties, a pseudo-noise code for receiving is controlled based on this delay discriminating property and the pseudo-noise code for transmitting tracks the pseudo-noise code for receiving.

22 Claims, 28 Drawing Sheets

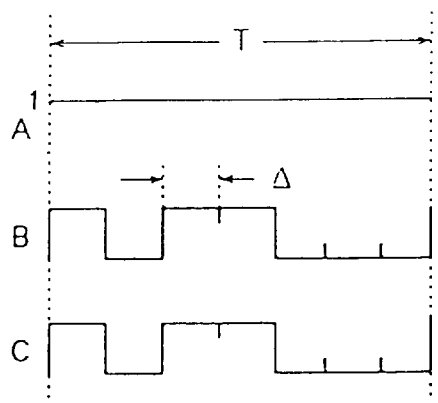
FIG. 20(a)
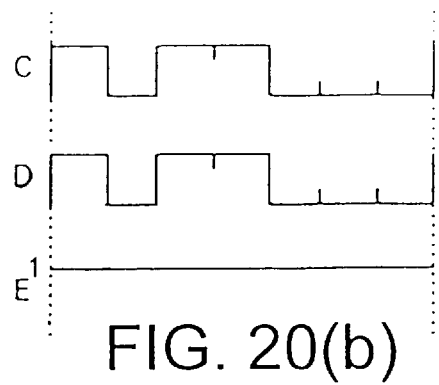
FIG. 20(b)
FIG. 21
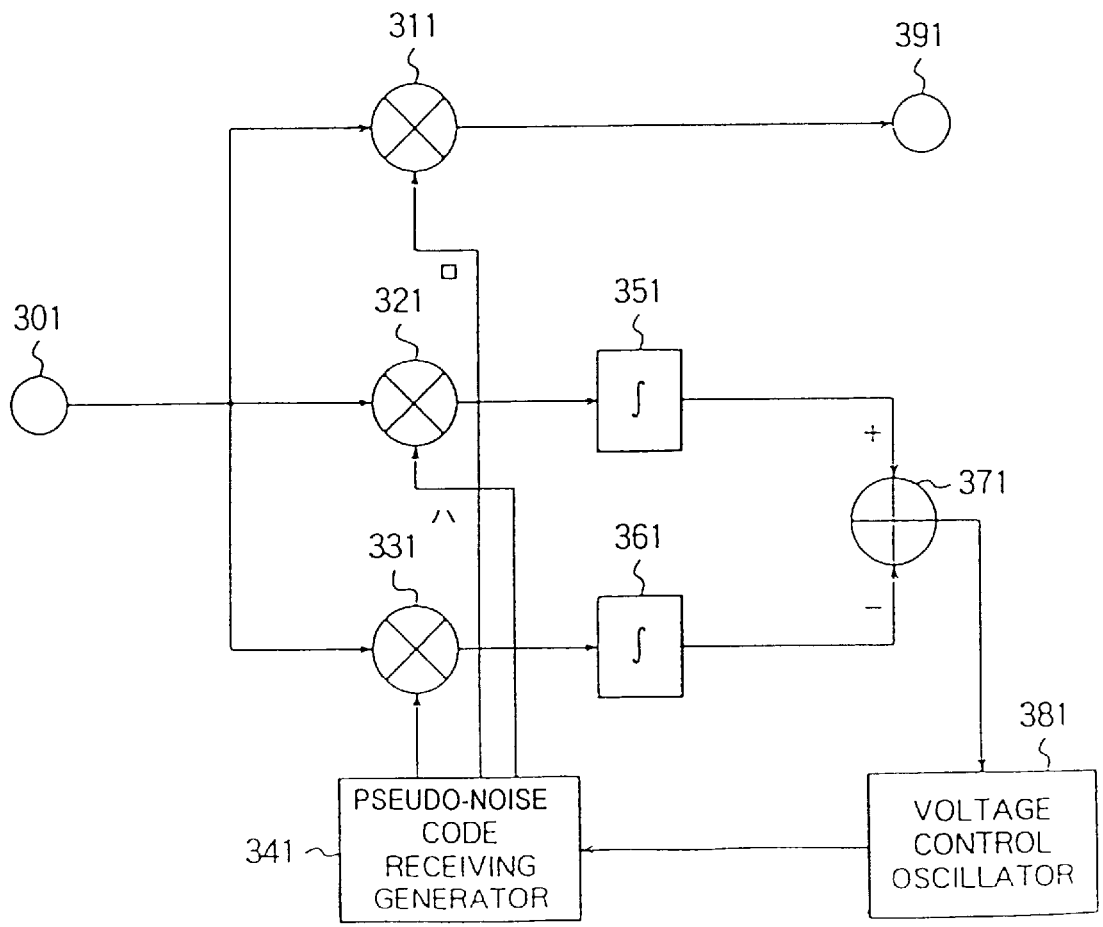

FIG. 23
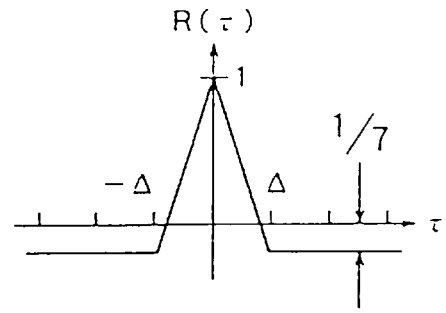
FIG. 24(a)
FIG. 24(b)
FIG. 24(c)
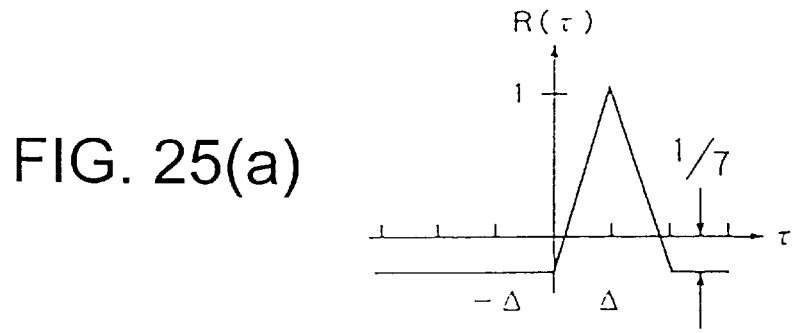
FIG. 25(a)
FIG. 25(c)
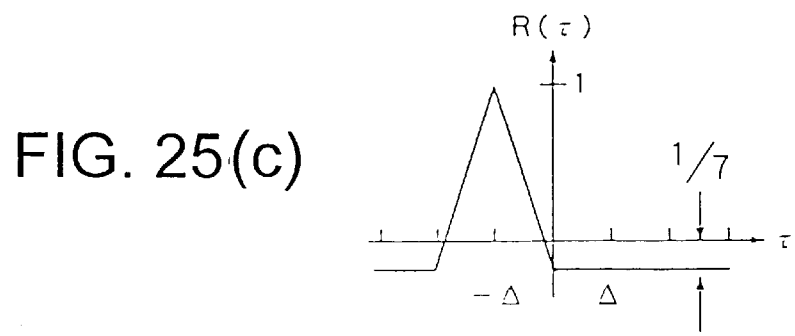

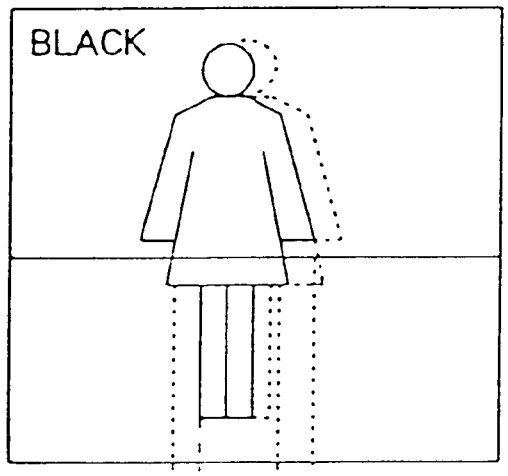
FIG. 34(c)
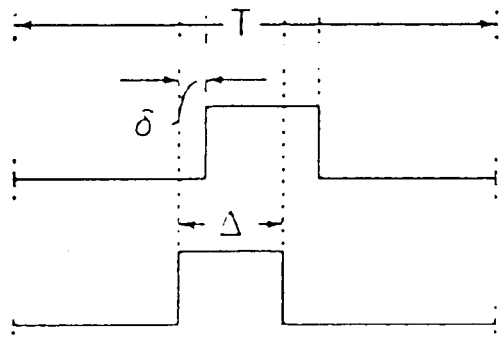
FIG. 34(b)
FIG. 34(d)
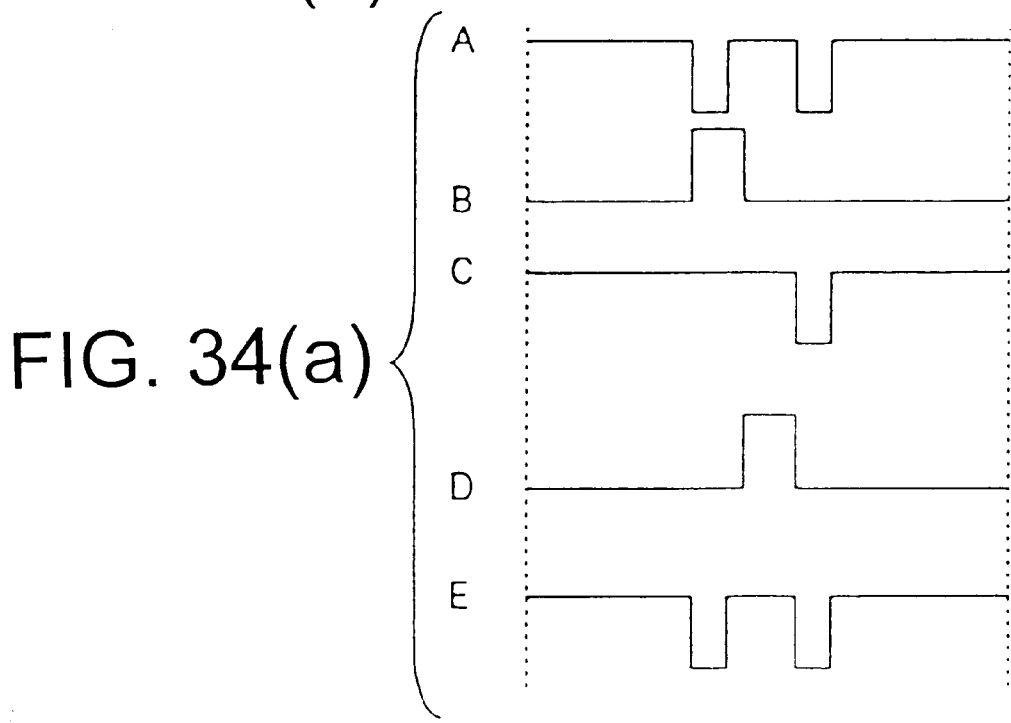
FIG. 34(a)

FIG. 35
(PRIOR ART)
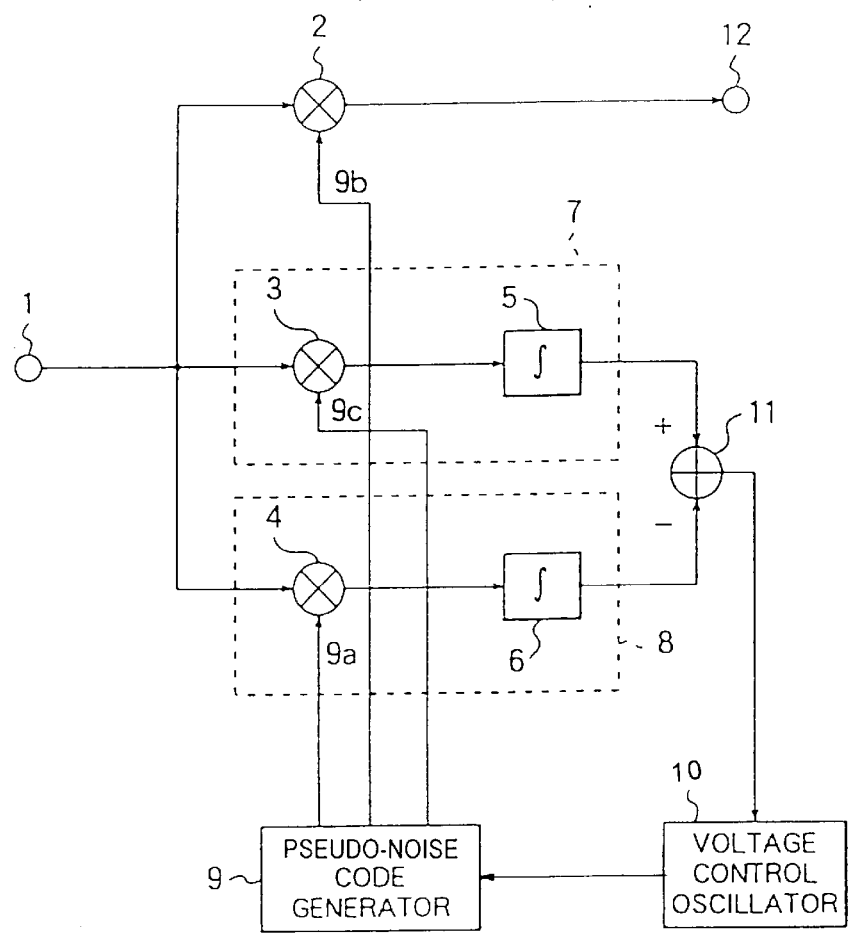
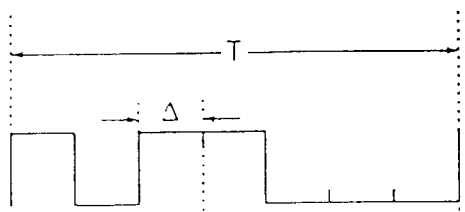
FIG. 36 (a)
(PRIOR ART)
FIG. 36 (b)
(PRIOR ART)
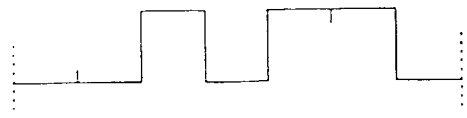
FIG. 36 (c)
(PRIOR ART)

CORRELATOR AND SYNCHRONOUS TRACKING APPARATUS USING TIME SHARING OF A RECEIVED SIGNAL IN A SPREAD SPECTRUM RECEIVER

BACKGROUND OF THE INVENTION

1. Field of the Invention

The present invention relates to a correlator for determining correlation properties providing a measure of similarity or mutual dependency between two functions, a spread spectrum communications system receiver using this correlator and to a synchronous tracking apparatus for pseudo-noise codes used in reverse spread processing performed when obtaining a data signal from a received signal.

2. Description of the Related Art

The parts of a spread spectrum communicator which differ clearly from other radio communicators are the initial acquisition apparatus and tracking apparatus provided in the receiving portion. Spread spectrum communication is widely known, but a simple explanation follows.

In the transmission portion of a spread spectrum communicator, spread processing is carried out in which a data signal is multiplied by a pseudo-noise code for transmitting. In the reception portion, reverse spread processing is carried out in which a receive signal is multiplied by a pseudo-noise code for receiving. The pseudo-noise codes used in the spread processing and reverse spread processing are identical and a data signal is played back at the reception portion only when they are have the same phase. Identical codes are used since the pseudo-noise code to be used can be decided in advance by the communicating parties. However, in order to obtain the same phase, a pseudo-noise code generated for receiving at the receiving side must be adjusted to match the pseudo-noise code for transmitting contained in the transmission signal which must be continuously tracked at all times. This process of acquisition is called "initial synchronization or initial acquisition" and the tracking process is called "synchronous tracking".

The basic configuration of a delay-lock loop generally used as a synchrony tracking apparatus is here shown in FIG. 35. The operation of this delay-lock loop will next be explained. In FIG. 35, 1 is an input terminal, 2~4 are multipliers, 5 and 6 are integrators, 7 and 8 are correlators, 9 is a pseudo-noise code generator for receiving, 10 is a voltage control oscillator, 11 is a calculator and 12 is an output terminal.

A signal inputted to input terminal 1 is a data signal which has been multiplied by a pseudo-noise code for transmitting and spread processed. This data signal can be an analog signal or a digital signal, but usually a signal to which some kind of primary modulation has been carried out is used. However, the presence of a data signal complicates the understanding of the operation in an explanation of the tracking apparatus and so in order to simplify the explanation, it is here assumed that the receive signal is only a pseudo-noise code for transmitting.

A pseudo-noise code for transmitting inputted to the input terminal 1 is inputted to the multipliers 2~4 and multiplied with a pseudo-noise code outputted from the pseudo-noise code generator 9 for receiving (generator 9). The three pseudo-noise codes $9a$~$9c$ outputted from the pseudo-noise code generator 9 for receiving which have different phase relations as shown in FIGS. 36($a$)–($c$). The pseudo-noise codes used here are M-sequence codes obtained from a $3^{rd}$-order primitive polynomial in which the time of 1 cycle length is expressed as T and the time of 1 chip as $\Delta$. There are two kinds of M-sequence codes obtained from a $3^{rd}$-order primitive polynomial, one of which is shown here as an example. FIGS. 36($a$)–($c$) depict a phase relation wherein phases are each delayed sequentially by one chip.

Delay discriminating properties of a synchronous tracking apparatus will next be explained. Delay discriminating properties are expressed as a change in amplitude value related with time-lag and time-lag is achieved from changes in amplitude value by using such properties. Delay discriminating properties are obtained from a composite of two correlation properties. These two correlation properties are produced by correlators 7 and 8. Though they are widely known, correlation properties will be explained before an explanation of correlators 7 and 8.

A correlation property is expressed with a correlation function; mathematically explained, it is giving the measure of similarity or mutual dependency between a function f1 (t) and a function f2 (t) which functionally expresses the deviation of one function to the other. If the deviation is expressed as a parameter $\tau$, this correlation function R21 is defined with equation (1):

$$R21(\tau) = \int_{-\infty}^{\infty} f2(t) \cdot f1(t-\tau)dt \tag{1}$$

In other words, while varying the time of function f1 (t) against function f2 (t) as a reference, both functions are multiplied and integrated. A correlation function obtained when function f1 (t) and function f2 (t) are the same is called an auto-correlation function and a correlation property obtained when said functions are different is called a cross-correlation function.

To obtain a concrete form of equation 1, the functions f1 (t) and f2 (t) are expressed as signals, the signals are input. In FIG. 35, the signals are deemed as pseudo-noise codes and a correlation value is obtained by integrating both pseudo-noise code multiplication results over a period of 1 cycle length.

Correlator 7 consists of a multiplier 3 and an integrator 5; correlator 8 consists of a multiplier 4 and an integrator 6. Correlation properties are obtained from correlators 7 and 8 and a delay discriminating property is obtained by a synthesis of these correlation properties. This process will be explained. As FIGS. 36($a$)–36($c$) show, the only difference between correlator 7 and correlator 8 is the phase relation between the pseudo-noise codes respectively inputted to multipliers 3 and 4. In other words, identical correlation curves are merely being obtained in different time axes. The correlation curve obtained with correlator 7 will first be explained.

A pseudo-noise code inputted to input terminal 1 and a pseudo-noise code outputted from pseudo-noise code generator 9 for receiving are inputted to the multiplier 3 of correlator 7. Since one of these input signals is a receive signal and the other is a signal generated at a receiver, their respective frequencies inevitably differ until synchrony is tracked. This is not the same as if the phase of one of two signals having equal frequency were to be shifted. Let us therefore investigate the waveforms of both signals and the multiplication result when the phase difference of a pseudo-noise code outputted from pseudo-noise code generator 9 for receiving is shifted with respect to a pseudo-noise code inputted to input terminal 1. This is shown in FIG. 37.

FIGS. 37 ($a$)–($e$) respectively show pseudo-noise codes when the phase difference of a pseudo-noise code outputted from pseudo-noise code generator 9 for receiving is $+\Delta$, +Δ/2, 0, −Δ/2 and −Δ, with a pseudo-noise code inputted to input terminal 1 as a reference, and the multiplication results thereof. The signal waveform shown at A is a pseudo-noise code inputted to input terminal 1, the signal waveform shown at B is a pseudo-noise code outputted from pseudo-noise code generator 9 for receiving and the signal waveform shown at C is an output signal from multiplier 3. In other words, the signal waveform shown at B corresponds to the signal inputted to the multiplier 3 shown in FIG. 36 (c). Further, the amplitude values of the signal waveform shown at A to C in FIG. 37 is set to ±1.

Since the correlation value is an integration over 1 cycle length of the waveform shown at C, it is equivalent to the multiplication result period −1 subtracted from period 1 and the division of this result over 1 cycle length T. For instance in (a), period 1 is 3Δ, period −1 is 4Δ and therefore (3Δ−4Δ)/T=(3Δ−4Δ)/7Δ=−1/7. In (b), (5Δ−2Δ)/7Δ=3/7 and in (c), (7Δ−0Δ)/7Δ=1.

The above analysis used representative values for phase difference between two pseudo-noise codes, but essentially phase difference is varied continuously to determine correlation curves. This is shown in FIG. 38 in which the horizontal axis shows phase difference τ between 2 pseudo-noise codes and the vertical axis shows correlation value Rss (τ). This curve reveals that the maximum correlation value is attained when the phase difference between 2 pseudo-noise codes is 0 and minimum correlation value is attained during the regions where τ≦−Δ and Δ≦τ. Furthermore, it can be seen that this curve is symmetrical on both sides with respect to a correlation value axis in which phase difference is 0.

The maximum and minimum values of this correlation curve can also be determined from the following general equations:

$$\text{Maximum Correlation Value} = \frac{1}{n}(2^k - 1) \quad (2)$$

Substitute Specification − Comparison $$\text{Maximum Correlation Value} = \frac{1}{n}\left[\left(\frac{2^k}{2} - 1\right) - \left(\frac{2^k}{2}\right)\right] \quad (3)$$

Here, k is a degree of a pseudo-noise code primitive polynomial, n is the number of chips and n=$2^k$−1.

Having understood the correlation curve, let us now examine the phase relation of the pseudo-noise codes in FIGS. 36(a)–36(c), which shows a phase relation between pseudo-noise codes outputted from the pseudo-noise code generator 9 for receiving. Taking FIG. 36(b) as a reference, the pseudo-noise code in FIG. 36(a) the phase of which has advanced by 1Δ is inputted to multiplier 4 of correlator 8 and pseudo-noise code in FIG. 36(c) the phase of which is delayed by 1Δ is inputted to multiplier 3 of correlator 7. The correlation curves obtained here are shown respectively in FIGS. 39 and 40.

Calculator 11 subtracts the output of correlator 8 from the output of correlator 7; i.e. the FIG. 39 curve is subtracted from the FIG. 40 to obtain a curve such as that shown in FIG. 41. This curve is asymmetrical on both sides with respect to a correlation value axis in which the phase difference between 2 pseudo-noise codes is 0.

Let us assume here that a correlation value of 4/7 is detected from the output of calculator 11 and determine a phase difference from this correlation value. A correlation value of 4/7 would give two phase differences at the points P1 and P2 shown in FIG. 41. Phase difference at P1 is −Δ/2 and phase difference at P2 is −3Δ/4. Although it is not possible here to assess whether the phase difference between the codes is −Δ/2 or −3Δ/4, we can assess that phase difference is shifting in one direction. In other words, the phase shift direction (time shift direction) can be assessed from the correlation value (the output voltage of calculator 11). Once the phase shift direction has been assessed, the phase direction can be controlled based on this assessment. This curved depicted in FIG. 41 is termed a delay discriminating curve.

Having obtained a delay discriminating curve, the operation of a tracking loop will next be explained. The delay discriminating curve obtained from the output of calculator 11 is used subsequently to control the voltage control oscillator 10. The property of the voltage control oscillator 10 is here set as shown in FIG. 42. The horizontal axis in FIG. 42 is input voltage and the vertical axis is output frequency. Therefore, if the value of the input voltage provided to the voltage control oscillator 10 is increased, the oscillating frequency of the output signal also increases; conversely, if the input voltage value is lowered, the output signal oscillating frequency decreases. In addition, the free-run frequency outputted when the input control voltage is 0 is set at a frequency fo equal to the chip speed of the pseudo-noise code for transmitting.

By setting in this way, output frequency of the voltage control oscillator 10 can be controlled in compliance with the delay discriminating curve (the output voltage of calculator 11). An output signal of the voltage control oscillator 10 controlled in this way is subsequently inputted to the pseudo-noise code generator 9 for receiving. If this pseudo-noise code generator 9 for receiving comprises a linear feedback shift register (LFSR), an output signal of the voltage control oscillator 10 is inputted as a clock signal to drive the LFSR. By inputting a clock signal to the LFSR, a pseudo-noise code in which 1 chip is equal to 1 cycle length of this clock signal can be created. This process is well known and need not be explained here. As a result, a pseudo-noise code with a chip speed in compliance with an oscillating frequency outputted from the voltage control oscillator 10 can be created.

A tracking apparatus formed from the above configuration will next be examined with the assumption that the phase difference between a pseudo-noise code for transmitting inputted to input terminal 1 and a pseudo-noise code for receiving outputted from the pseudo-noise code generator 9 for receiving was −Δ.

A reading of the correlation value when phase difference is −Δ in the delay discriminating curve shown in FIG. 41 gives a value of 8/7. The voltage control oscillator 10 outputs an oscillating frequency in compliance with this correlation value. Since voltage control oscillator 10 has a free-run frequency of fo, this oscillating frequency increases when a correlation value of 8/7 is applied thereto. Let us assume that the oscillating frequency here is fo+α. As a result, the pseudo-noise code generator 9 for receiving creates a pseudo-noise code with a clock signal of fo+α and the chip speed of the code created is also fo+α.

Since the free-run frequency fo of the voltage control oscillator 10 has been set to match the chip speed of the pseudo-noise code for transmitting as explained above, in comparison with the frequency of the pseudo-noise code for transmitting, the frequency of the pseudo-noise code for receiving increases by α only. In other words, the frequency of the pseudo-noise code depicted at B in FIG. 37 (e) increases in comparison with the pseudo-noise code depicted at A. Viewed in terms of phase, this is equivalent to an advance in the phase of the pseudo-noise code at B.

Consequently, the correlation value gradually decreases as phase difference approaches 0 in line with the delay discriminating curve in FIG. 41.

Conversely, let us examine a case in which phase difference is +Δ. The correlation value here is −8/7 and the oscillating frequency outputted from the voltage control oscillator 10 decreases to less than the free-run frequency fo. If we assume that the frequency here is fo−α, the chip speed of the pseudo-noise code for receiving becomes fo−α and in comparison with the frequency of the pseudo-noise code for transmitting, the frequency of the pseudo-noise code for receiving decreases by a only. In other words, the frequency of the pseudo-noise code depicted at B decreases in comparison with the pseudo-noise code depicted at A in FIG. 37 (a). Viewed in terms of phase, this is equivalent to a delay in the phase of the pseudo-noise code at B. Consequently, the correlation value gradually increases as phase difference approaches 0 in line with the delay discriminating curve in FIG. 41.

In other words, feedback control is executed so that the phase difference created between a pseudo-noise code for transmitting and a pseudo-noise code for receiving is 0. A delay discriminating curve is formed by combining correlation curves obtained on different time axes and is created by 2 pseudo-noise codes with a phase relation such as that shown at in FIGS. 36(a) and (c). Thus if a pseudo-noise code in FIG. 36(b) positioned exactly between these 2 pseudo-noise codes is created on the receiving side, a pseudo-noise code for receiving which is already phase-synchronized to the pseudo-noise code for transmitting can be obtained.

One of the multiplier 2 input signals is a pseudo-noise code for transmitting inputted to input terminal 1 and the other signal is the pseudo-noise code for receiving the code in FIG. 36(b) outputted from the pseudo-noise code generator 9 for receiving; the signal outputted from multiplier 2 is therefore a data signal which has been reverse spread processed and this is then led to output terminal 12.

The above explanation related to a synchronous tracking apparatus used in a conventional spread spectrum receiver and a delay discriminating curve described here was obtained by multiplying a pseudo-noise code phase-advanced by 1 chip with respect to a pseudo-noise code in which phase conformed to tracking and a pseudo-noise code phase-delayed by 1 chip with respect to the conformed code by a receive signal. In other words, the phase difference between 2 pseudo-noise codes required to obtain the delay discriminating curve was 2 chips. A delay discriminator for creating this curve is generally referred to as a 2ΔDD (Delay-Discriminator) but there is also a delay discriminator referred to as a 1ΔDD in which sensitivity toward the time axis (phase difference axis) has been raised.

While a 2ΔDD del~y discriminating curve exhibits an S-shaped curve in the region where phase difference is −2Δ~2Δ as FIG. 41 shows, 1ΔDD exhibits an S-shaped curve in the region from −Δ~Δ. The lines cutting the correlation value axis where phase difference 0 reveal that the slope of the 1ΔDD curve is twice that of the 2ΔDD curve which shows that the 1ΔDD tracking performance is superior.

Thus a synchronous tracking apparatus used in a spread spectrum communications system receiver creates 2 correlation curves on different time axes, obtains a delay discriminating curve having an S-shape curve with respect to a time axis (phase difference) by merging the 2 correlation curves and thereby enables tracking to be carried out. However, this tracking apparatus has an extremely serious drawback.

Namely, the signal line (from the receiver input signal to the reverse spectrum spread signal output terminal) for obtaining a desired data signal and the tracking loop are independent of each other. This will be explained using FIG. 35. First, a receive signal inputted to input terminal 1 branches into three signals which are inputted to multipliers 2~4. Of these, a delay discriminating curve required for tracking is created from the receive signals inputted to multipliers 3 and 4. If the circuit is operating ideally, the phases between the 3 pseudo-noise codes outputted from the pseudo-noise code generator 9 for receiving will be equally spaced and the phase of a pseudo-noise code outputted from multiplier 2 will match the phase of the pseudo-noise code contained in the receive signal which has branched into three and inputted to multiplier 2.

However, in practice it is extremely difficult to ensure that the circuit operates ideally. For instance, circuit elements vary according to manufacture and there may conceivably be phase deviation between the 3 pseudo-noise codes outputted from pseudo-noise code generator 9 for receiving. FIGS. 43(a)–(c) show this. FIGS. 43(a)–(c) are three pseudo-noise codes outputted from the pseudo-noise code generator 9 for receiving in a case in which the phase of FIG. 36(c) is delayed with respect to FIG. 36(b) by Δ−α. The resulting correlation curve is depicted in FIG. 44. P indicates the point at which correlation value is 0, but phase difference here is not 0. Since the tracking loop performs phase-aligning to produce a correlation value of 0, a phase error of α/2 occurs between the receive signal and pseudo-noise code (2). The pseudo-noise code contained in the receive signal and the pseudo-noise code outputted from the pseudonoise code generator 9 for receiving are multiplied at multiplier 2 with the fixed phase offset between them unremedied. As a consequence, an unnecessarily high frequency noise is appended to the data signal outputted from output terminal 12, rendering it a data signal of poor quality.

In order to deal with this phase error, the phase error needs to be detected somehow from the data signal derived from output terminal 12 and feedback must be applied to the tracking loop. However, such feedback control is not possible and at present no tracking apparatus capable of feedback control has been developed.

The reasons why feedback control is not possible will next be explained. The tracking apparatus itself operates two correlators on different time axes and creates a delay discriminating curve by combining the correlation curves thereby obtained. Since there is only one multiplier for the output terminal 12 at which the data signal is obtained, even if an integrator is provided after this multiplier and included in the configuration of the correlator, a delay discriminating curve cannot be created because only one correlation curve is obtained. A possible solution would seem to be somehow forcing the phase difference to 0 using a single correlator.

However, as FIG. 38 shows, a correlator curve is symmetrical on both sides with respect to a correlation value axis in which the phase difference between two pseudo-noise codes is 0. With the curve in FIG. 38, if the correlation value is 1 it can be assessed that phase difference is 0. When the correlation value is 3/7, it is not possible to judge whether phase difference is −Δ/2 or +Δ/2. In other words, phase control cannot be executed since the direction of the phase error cannot be assessed. There is also the problem that 3 pseudo-noise codes with different phases must be created at the receiving side. There is interference between pseudo-noise codes which are created with 1-chip phase differences and with a limited transmission cable capacity this can cause jumping to other circuits.

In addition, there is the problem that an LFSR must be operated at double clock speed in order to obtain a 1ΔDD delay discriminating curve using an LFSR. This is because only a 1-chip phase difference between codes can be extracted from the LFSR and therefore it is not possible to create pseudo-noise codes with a phase difference of Δ/2 required for reverse spread spectrum processing. Nevertheless, a 1ΔDD curve can be obtained from pseudo-noise codes at the same chip speed generated using the same LFSR. A 1 chip phase difference is halved by creating pseudo-noise codes at double clock speed. Since this doubles the speed of the pseudo-noise codes, their speed is halved before inputting them to the delay discriminator.

This problem cannot be solved simply by doubling clock speed. For instance, when a high process gain (spread with a pseudo-noise code having an extremely high speed in comparison with the data amount) system is to be operated in a high frequency band, the clock speed of the LFSR must of course be increased. In actual fact, the clock speed is limited by the response speed of the circuit elements and it is extremely difficult to double this speed in a frequency band near the speed limitation. If the system is given priority regardless of these limitations, it will be necessary to use highly expensive elements.

Following on from the above-mentioned problems, when a tracking apparatus is to be configured as an integrated circuit, a double clock signal must be routed around between the circuits. Considering the probability of interference and jumping between cables, a high frequency signal would be disadvantageous.

SUMMARY OF THE INVENTION

In a synchronous tracking apparatus of a spread spectrum receiver of the present invention, data obtained by multiplying a receive signal by a pseudo-noise code for receiving is time-shared by differing time-sharing circuits, first and second correlation curves are created which are asymmetrical on both sides with respect to a correlation value axis in which the phase difference between a pseudo-noise code for transmitting contained in the receive signal and a pseudo-noise code for receiving is 0, a delay discriminating curve is created by combining these correlation curves, a pseudo-noise code for receiving is controlled based on this delay discriminating curve and the pseudo-noise code for transmitting tracks the pseudo-noise code for receiving.

When tracking is carried out, a data signal is extracted from the multiplication result immediately before the time-sharing circuit in order to ensure that the phase of the pseudo-noise code for transmitting contained in the receive signal matches the phase of the pseudo-noise code for receiving. In other words, it is now possible to on-loop control the phase between the codes since data is obtained from one portion of the tracking loop. Two correlation curves with differing symmetries on identical time axes are created and a data signal is obtained from the tracking loop, therefore it is only necessary to multiply the receive signal by 1 pseudo-noise code. Furthermore, since this operation is performed on identical time axes, the amount of phase difference which can be detected from changes in the correlation values is only ±Δ and therefore a 1ΔDD configuration is sufficient. As a result, a 1ΔDD curve can be obtained without doubling the clock signal which drives the LFSR.

Furthermore, a correlator of this invention uses a time-sharing means to decrease data amount and thereby obtains a correlation curve asymmetrical to a correlation value axis in which τ=0 from a correlation curve symmetrical to a correlation value axis in which τ=0 obtained from a multiplier means for multiply a first signal and a second signal having as a function a parameter τ expressing the shift of one signal to another signal.

In this way, a correlation property obtained when the first and second signals are identical is rendered asymmetrical with respect to a correlation value axis in which τ=0 by using time-sharing means which is to decrease data amount from a multiplication result of a first signal and a second signal having as a function a parameter τ expressing the shift of one signal to another signal. The correlator is itself thereby able to assess phase advance or delay.

BRIEF DESCRIPTION OF THE DRAWINGS

FIG. 20 is a signal waveform diagram explaining spread spectrum/reverse spread spectrum processing of a spread spectrum tranceiver.

FIG. 21 is a block diagram of an excerpt from the circuit depicted in FIG. 19.

FIG. 23 is an explanatory diagram of a correlation curve of a spread spectrum receiver.

FIG. 24 is a signal waveform diagram to explain the operation of FIG. 21.

FIG. 25 is an explanatory diagram of a correlation property of a spread spectrum receiver.

FIG. 34 is a diagram of a signal waveform to explain the operation of FIG. 32.

FIG. 35 is a block diagram to explain a synchronous tracking apparatus in a conventional spread spectrum receiver.

FIGS. 36(a)–36(c) is a diagram of a signal waveform used in the explanation of FIG. 35.

DESCRIPTION OF THE PREFERRED EMBODIMENTS

Figure 1:
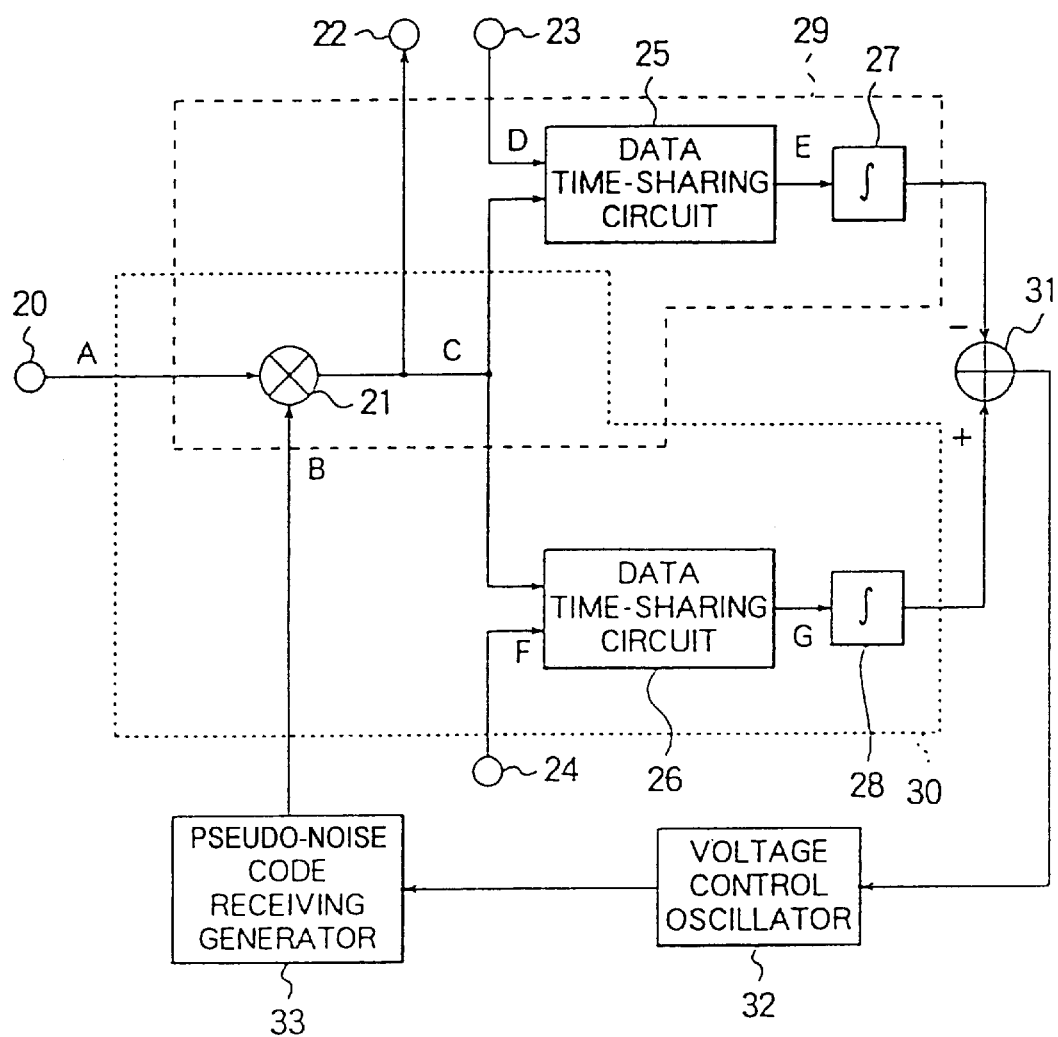
FIG. 1 is a block diagram explaining a first embodiment of the present invention.
Figure 2A:
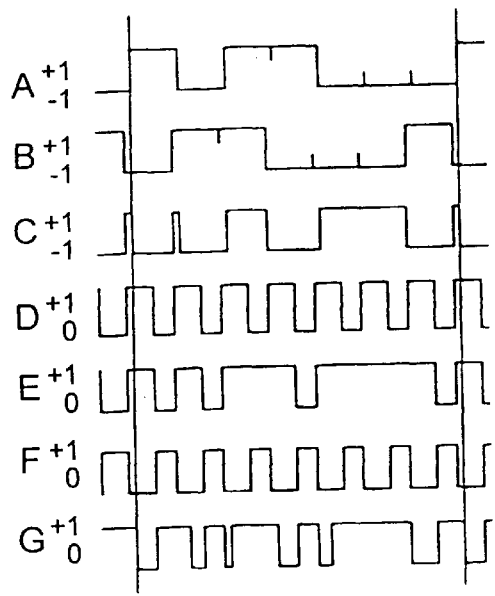
FIG. 2 is a signal waveform diagram explaining the operation of FIG. 1.
Figure 2C:
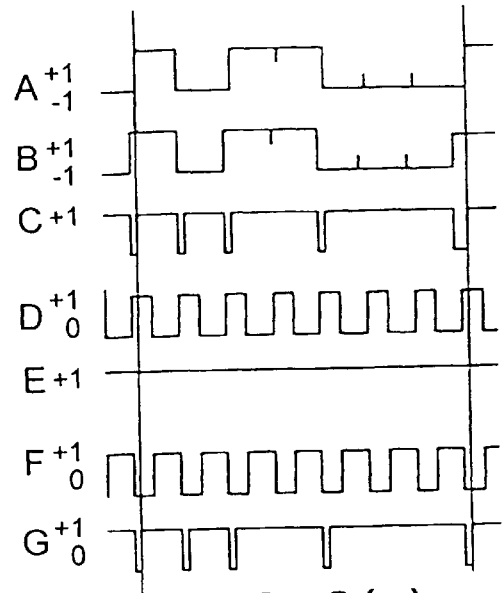
Figure 2B:
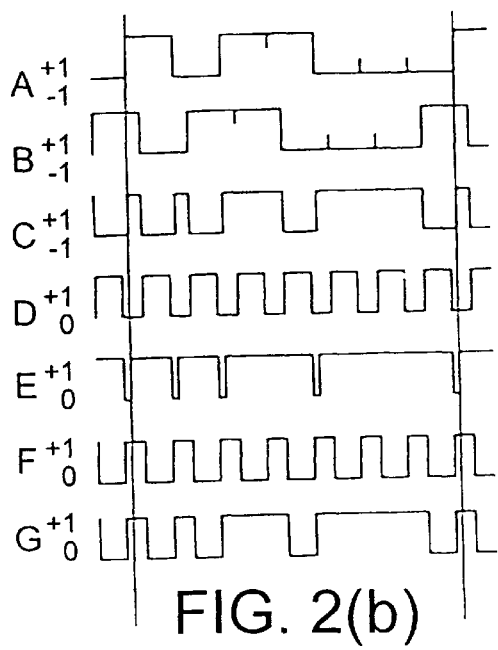
Figure 2D:
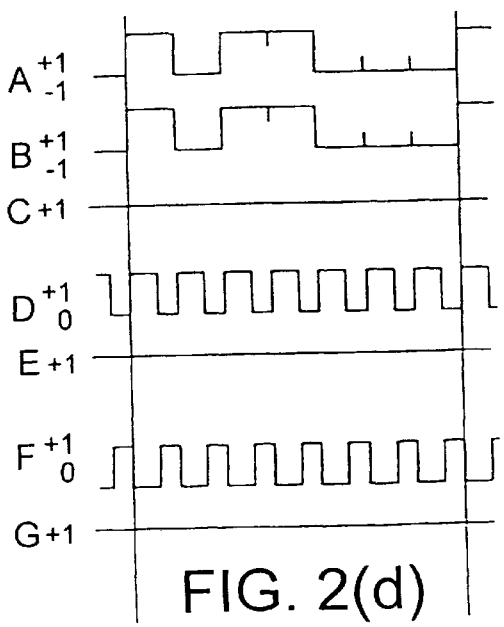

The embodiments of the present invention will next be explained with reference to the diagrams. FIG. 1 is a block diagram explaining a first embodiment of the present invention. 20 is an input terminal for a receive signal, 21 is a multiplier, 22 is a data signal output terminal, 23 and 24 are timing signal input terminals, 25 and 26 are data time-sharing circuits, 27 and 28 are integrators, 29 is a first correlator, 30 is a second correlator, 31 is a calculator, 32 is a voltage control oscillator, 33 is a pseudo-noise code receiving generator.

A signal wherein data have been spread with a pseudo-noise code is inputted to input terminal 20. This spread signal is inputted to one of the terminals of the multiplier 21, a pseudo-noise code generated by the pseudo-noise code generator 33 is inputted to the other terminal, reverse spread processing is performed by multiplying the two and data is outputted from the data signal output terminal 22. Simultaneously, a data signal is inputted to one of the terminals of the data time-sharing circuits 25 and 26. These data time-sharing circuits 25 and 26 time-share data inputted to timing input terminals 23 and 24 respectively using timing signals and subsequently output said data to integrators 27 and 28. Integrators 27 and 28 integrate time-shared data and output correlation values. The calculator 31 subtracts a correlation value obtained from the output of integrator 27 from a correlation value obtained from the output of integrator 28 and thus outputs a delay discriminating property. If the voltage control oscillator 32 is set to output an oscillating signal in compliance with the delay discriminating property outputted from the calculator 31, the pseudo-noise code generator 33 outputs a pseudo-noise code at a frequency based on this oscillating signal.

The above is a description of the usual operation of the configured circuit. A tracking apparatus using signal waveforms and such like will next be explained in detail. Firstly, for the data signal to be processed, 1 is here defined as a continuous signal. In other words, a data signal which has been spread processed is equivalent to a pseudo-noise code. Furthermore, a pseudo-noise code is defined as a type of M-sequence code obtained from a $3^{rd}$-order primitive polynomial. The pattern generated by this pseudo-noise code is identical to that depicted in FIG. 36. Correlator 29 will first be explained using this pseudo-noise code.

Correlator 29 comprises a multiplier 21, a data time-sharing circuit 25 and an integrator 27. A receive signal inputted to input terminal 21 and a pseudo-noise code outputted from pseudo-noise code generator 33 are inputted to the multiplier 21 and multiplied. At this stage, the phase relation of both pseudo-noise codes is unknown.

Figure 3A:
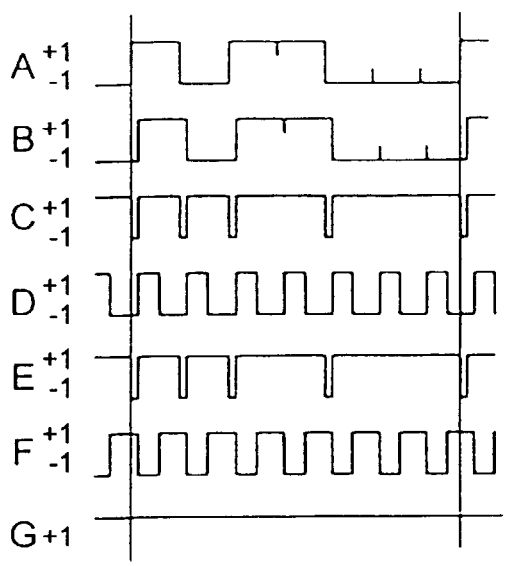
FIG. 3 is a signal waveform diagram explaining the operation of FIG. 1.
Figure 3C:
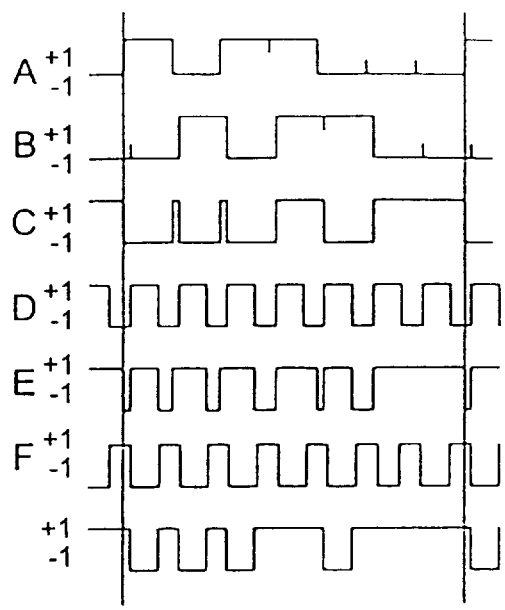
Figure 3B:
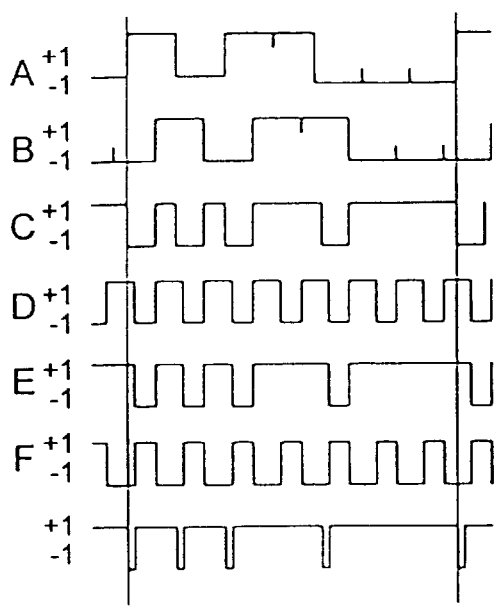

With the phase of the receive signal as a reference, the phase difference τ of the pseudo-noise code outputted from the pseudo-noise code generator 33 is allocated separately as τ>Δ, Δ>τ>Δ/2, Δ/2>τ>0, τ=0, 0>τ>−Δ/2, −Δ/2>τ>−Δ, −Δ>τ respectively. These are shown in FIGS. 2 (a)–(d) and FIGS. 3(a)–(c). In FIGS. 2 and 3, waveform A is a receive signal, waveform B is a pseudo-noise code outputted from the pseudo-noise code generator 33, C is a multiplication result. Further the amplitude values of the signal waveform shown at A to C in FIGS. 2 to 3 are set to ±1.

Figure 4:
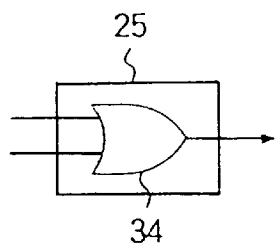
FIG. 4 is a concrete circuit diagram of the time-sharing circuit shown in FIG. 1.

Data time-sharing circuit 25 time-shares data from this multiplication result with a particular timing. A concrete example of this data time-sharing circuit is depicted in FIG. 4, which shows an OR calculator.

A timing signal now applied at the timing signal input terminal 23 is phase synchronized to a pseudo-noise code outputted from the pseudo-noise code generator 33 and it is assumed here that one cycle length is 1 chip and the signal has 50% duty. This is shown in FIGS. 2 and 3. Next, data time-sharing circuit will be described. Here, a binary operation is performed assuming that +1 in the amplitude value of the signal waveforms shown C in FIGS. 2 and 3 does not change, namely +1, and −1 in the amplitude value of the signal waveforms shown C in FIGS. 2 and 3 is 0.

An OR calculator outputs L level potential only when both input signals are at L level potential. Consequently, since the signal used as the timing signal is at the H level for a period of one half-chip and at the L level for the remaining half as described above, the data amount of the multiplication result inputted to one of the OR calculators is limited to half by the timing signal inputted to the other OR calculator. A waveform of a signal in which data have been time-shared from the multiplication result C is shown at E.

The integrator 27 integrates a time-shared data signal over 1 cycle length and a correlation value is thereby obtained. Let us now examine how the correlation value actually changes for each of the respective phase differences.

First, a comparison of multiplication result C and OR calculator output E when τ>Δ as depicted in FIG. 2 (*a*) reveals that the OR calculator output E is at the L level while the multiplication result C is at the L level and that this L level period coincides with the period when the timing signal D is at the L level; this confirms that the data amount is being limited to a half-chip. The correlation value here is at minimum value.

As a comparison of the OR calculator output E shown in FIG. 2 (*a*) with the OR calculator output E when Δ>τ>Δ/2 as in FIG. 2 (*b*) clearly shows, the L level period of E in (*b*) shortens as the phase difference diminishes. The correlation value when phase difference is D is the same as when τ>Δ, but the correlation value increases as the phase difference decreases and attains its maximum value when phase difference is Δ/2.

As can be clearly seen from the multiplication result C and timing signal D when Δ/2>τ>0 as in FIG. 2 (*c*), the period during which multiplication result C is at the L level is masked by the period during which the timing signal D is at the H level. As a result, the correlation value does not vary during the Δ/2>τ>0 period and maintains a constant value.

During the period when 0>τ>−Δ/2 shown in FIG. 3(*a*), since the period during which multiplication result C is at the L level coincides with the period during which the timing signal is at the L level, the multiplication result C is outputted unaltered and the correlation value decreases.

During the period when −Δ/2>τ>−Δ as shown in FIG. 3(*b*), the period in which the multiplication result C is at the L level exceeds the period in which the timing signal is at the L level. Nevertheless, the timing signal period limits the period in which the output E of the OR calculator is at the L level. Consequently, the correlation value does not vary during the period when −Δ/2>τ>−Δ and maintains a constant value. The correlation value is at its minimum value here.

Furthermore, during the period when −Δ>τ as shown in FIG. 3(*c*), phase difference is greater than 1 chip, as in a case when τ>0; data is therefore halved and the correlation value is at its minimum value.

Figure 5:
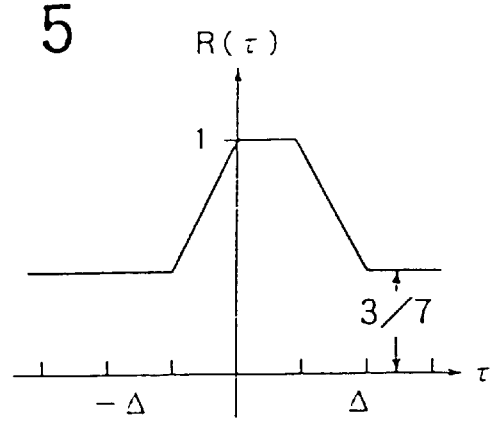
FIG. 5 is diagram showing a correlation curve obtained with the correlator in FIG. 1.

Based on the above analysis, a correlation curve obtained at the correlator 29 is shown in FIG. 5. Let us now qualitatively analyze the maximum and minimum correlation values attained by this correlation curve.

As FIG. 5 clearly shows, the correlation value attains its maximum during the period in which Δ/2≧τ≧0 at which time the OR calculator is outputting continuously at the H level. In other words, the correlation value attains its maximum. This is shown in Equation (4).

$$\text{Maximum Correlation Value} = \frac{1}{n}(2^k - 1) \qquad (4)$$

Alternatively, the period in which the correlation value attains its minimum value is during the regions where τ≧Δ and −Δ/2≧τ. The period in which multiplication result C is at the L level is halved by portioning out the data during this period. Supposing that the remaining half of this period is added to the H level, this can be shown in the following equation (5):

$$\text{Minimum Correlation Value} = \frac{1}{n}\left[\left(\frac{2^k}{2}\right) - 1 + \left(\frac{2^k}{2^2}\right) - \left(\frac{2^k}{2^2}\right)\right] \qquad (5)$$

$$= \frac{1}{n}\left(\frac{2^k}{2} - 1\right)$$

Here, k is a degree of a pseudo-noise code primitive polynomial, n is the number of chips and n=2^k−1.

Figure 38:
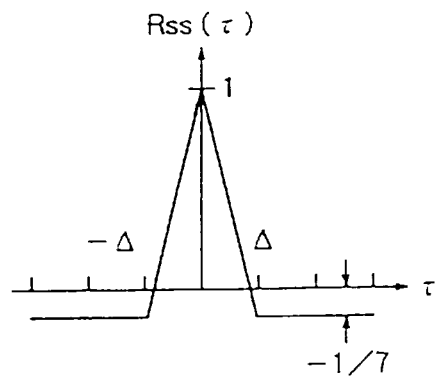
FIG. 38 is a diagram of a correlation curve for a correlation value when there is no phase difference between the pseudo-noise codes for transmitting and receiving.
Figure 39:
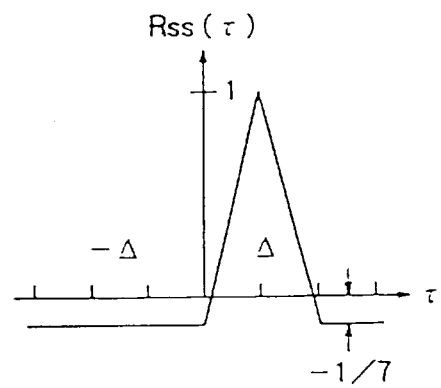
FIG. 39 is a diagram of a correlation curve for a correlation value when a pseudo-noise code for receiving is advanced 1Δ phase with respect to a pseudo-noise code for transmitting.
Figure 40:
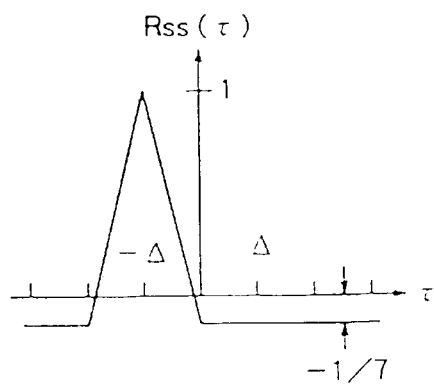
FIG. 40 is a diagram of a correlation curve for a correlation value when a pseudo-noise code for receiving is delayed by 1Δ phase with respect to a pseudo-noise code for transmitting.
Figure 41:
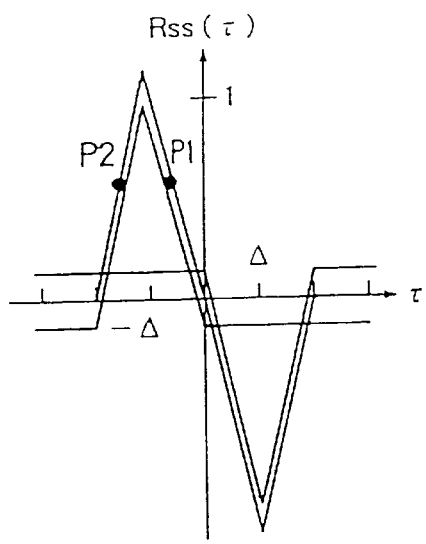
FIG. 41 is a diagram of a correlation curve when the curve in FIG. 39 has been subtracted from the curve in FIG. 40.
Figure 42:
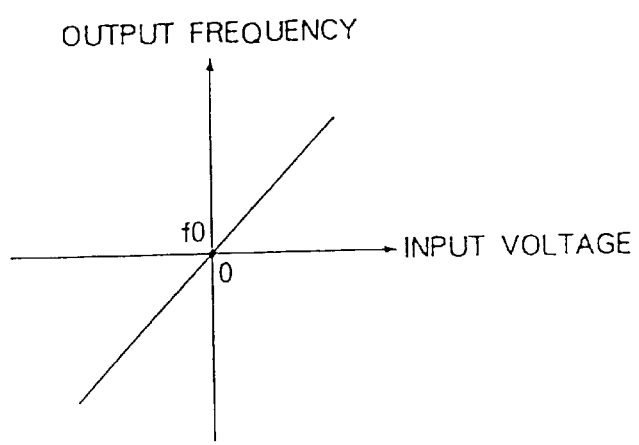
FIG. 42 is a property diagram explaining frequency control of the voltage control oscillator used in FIG. 35.
Figure 43:
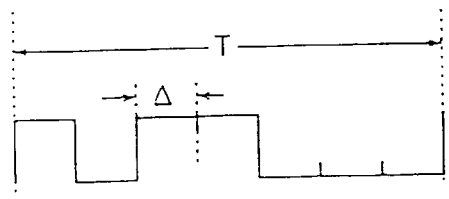
FIGS. 43(a)–(c) is a signal waveform diagram to explain conventional problems.
Figure 43:
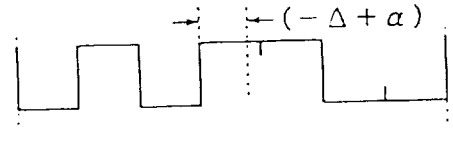
Figure 43:
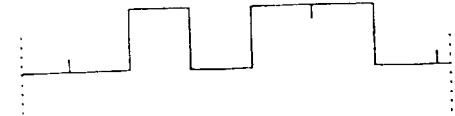

As FIG. 38 shows, although the correlation curve in the conventional example described above was a symmetrical curve with respect to a correlation value axis in which phase difference=0, this correlator is characterized in that it shows an asymmetrical curve. In other words, the correlation curve has been rendered asymmetrical by time-sharing the data. This is depicted conceptually in FIG. 6, in which (a) is the correlation curve shown in FIG. 38, (b) shows a timing signal for time-sharing data, (c) shows a correlation curve obtained from a data time-shared signal.

Since the data time-sharing circuit in this case in an OR calculator, it can be assumed that multiplication result data will be valid only when the timing signal has changed to the L level. This period is indicated by a thick line on curve (a). The period not indicated by a thick line is the period in which data are thinned (superseded) by time-sharing operation. Since there is unlikely to be any increase or decrease in the quantity of data during this data time-sharing period, correlation value does not vary. In other words, the correlation value in the period in which data are thinned (superseded) in FIG. 6 (*a*) is constant. The correlation curve shown in FIG. 6 (*c*) is obtained by joining the above correlation value to the correlation value (the thick line period) in which data is effective. This is shown in (c). Considered in this way, it can be understood intuitively that, by time-sharing data, the correlation curve becomes asymmetrical on both sides with respect to a correlation value axis.

Following the above detailed explanation of the operation of correlator 29, the other correlator 30 will next be explained. However, since correlators 29 and 30 have the same configuration and differ only in that the phases of timing signals inputted thereto are different, only the latter point will be addressed here.

As in correlator 29, the data time-sharing circuit 26 of correlator 30 here uses an OR calculator. It is assumed that the timing signal provided to timing signal input terminal 24 is a phase-inversed signal of the timing signal provided to timing signal input terminal 23. This is depicted in FIGS. 2 and 3. A data signal time-shared from the multiplication result by this timing signal has a signal waveform as depicted at G. A time-shared data signal is then integrated over 1 pseudo-noise code cycle length at the integrator 28 and a correlation value is obtained. The correlation curve shown in FIG. 7 is obtained by continuously varying the phase difference between two pseudo-noise codes.

Figure 6A:
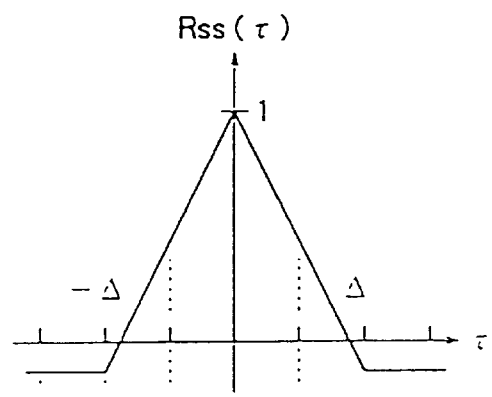
FIG. 6 is an explanatory diagram for explaining a correlation curve obtained by time-sharing circuit.
Figure 6B:
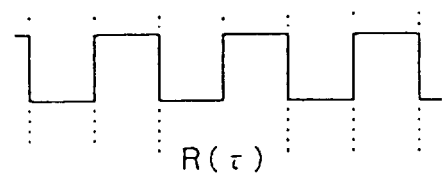
Figure 6C:
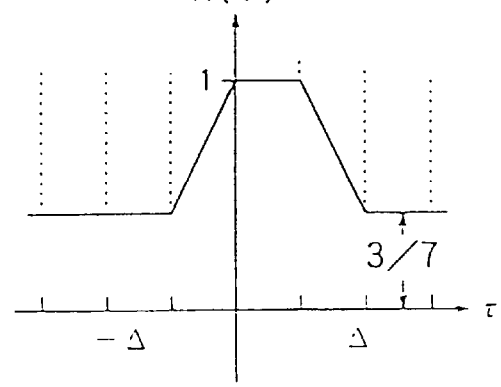
Figure 7:
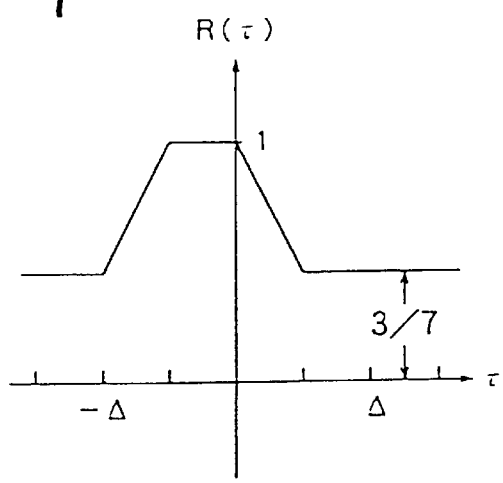
FIG. 7 is a diagram showing a correlation curve obtained with the correlator in FIG. 1.

Because the timing signal being inputted to correlator 30 is produced by shifting the timing signal inputted to correlator 29 by half a chip, the curve in FIG. 7 can be regarded as the curve in FIG. 5 shifted by half a chip. Furthermore, a correlation curve can be obtained for FIG. 7 by joining the valid periods as in FIG. 6. This is depicted in FIG. 8 in which (a) is the correlation curve shown in FIG. 38, (b) shows a timing signal for time-sharing data, (c) shows a correlation curve obtained from a data time-shared signal.

Figure 9:
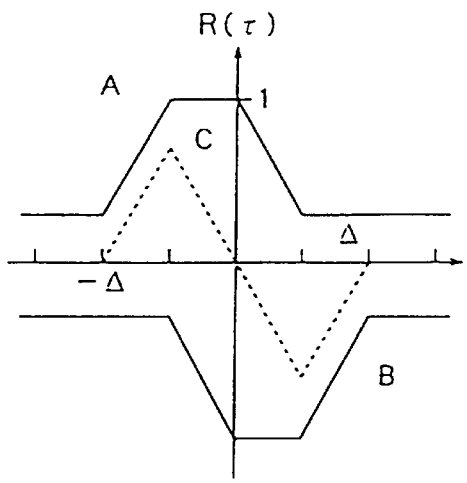
FIG. 9 is a diagram of a curve obtained by subtracting a curve of correlator 29 from a property of correlator 30 depicted in FIG. 1.
Figure 44:
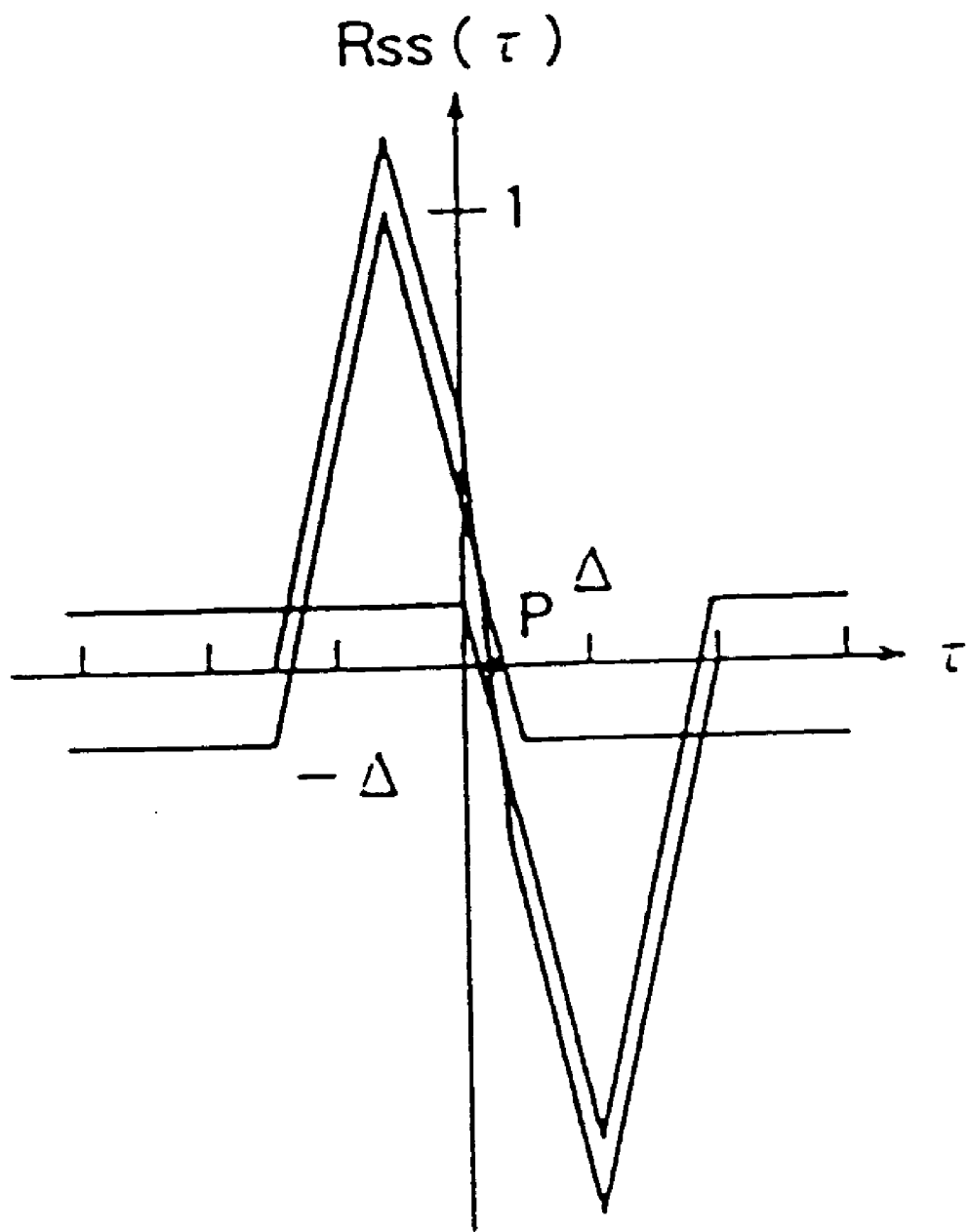
FIG. 44 is a property diagram to explain conventional problems.

Having understood how correlation values having the above defined correlation property are obtained by correlators 29 and 30, a delay discriminating property obtained by combining these properties will next be explained. A delay discriminating property is obtained by subtracting the correlator 29 output from the correlator 30 output at a calculator 31. This is shown in FIG. 9, where A is the correlation curve for correlator 30, B is a curve obtained by multiplying the correlation value of correlator 29 by −1 and C is a curve combining A and B. This C curve is the delay discriminating property. As can be confirmed, it is analogous to the property described in the conventional example. However, it should be noted that this property is a 1ΔDD delay discriminating property. As FIG. 44 shows, in contrast to the delay discriminating property explained in conventional example which was 2ΔDD exhibiting an S-shaped curve in the −2Δ~2Δ phase difference region, a delay discriminating property of the present embodiment depicted in FIG. 9 is 1ΔDD exhibiting an S-shaped curve in the −Δ~Δ phase difference region.

Based on the above, a synchronous tracking apparatus for phase synchronizing to a receive signal can be configured according to a delay discriminating property obtained in this embodiment by using a voltage control oscillator 32 for carrying out the same operation as that described in the conventional example and a pseudo-noise code generator 33.

Figure 8A:
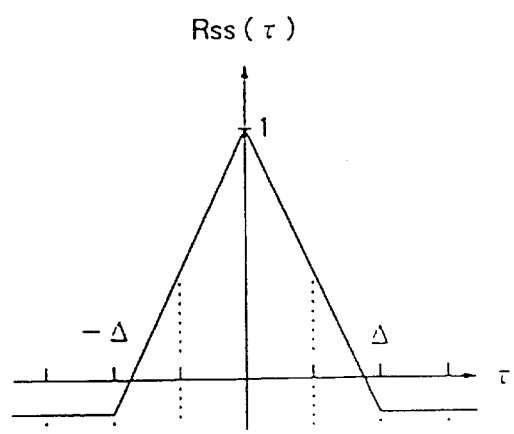
FIG. 8 is an explanatory diagram for explaining a correlation curve obtained by time-sharing circuit.
Figure 8B:
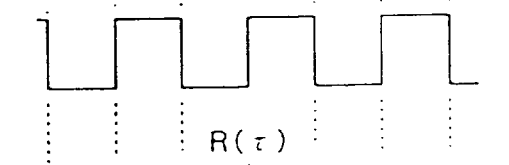
Figure 8C:
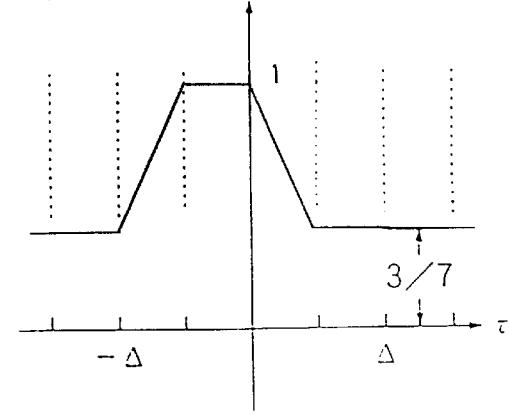

A 50% duty clock signal at the same frequency as a pseudo-noise code for receiving was used here as the timing signal for time-sharing data, but the timing signal frequency can be doubled or quadrupled as can be seen from the curves depicted in FIGS. 6 and 8. In these cases, a flat correlation curve region is created at the portion where the dynamic range of the correlation value has been halved or quartered and a delay discriminating property capable of synchronous tracking with a small dynamic range is obtained.

Similarly, when the clock signal duty ratio is not 50%, the dynamic range of one of the correlation value decreases while the dynamic range of the other correlation value increases. A delay discriminating property capable of synchronous tracking which has an asymmetric plus and minus dynamic range can thereby be obtained.

In this embodiment, correlation curves differing on the same time axis are created by time-sharing data from a multiplication signal of a receive signal and a pseudo-noise code generated at the receiver side, and a delay discriminating property obtained by combining these correlation properties is used to comprise a tracking loop. A 1ΔDD delay discriminating property realized with only one pseudo-noise code is thus obtained. Since a 1ΔDD delay discriminating property is obtained with no need for a double-speed clock signal, this reduces the problem of signal jumps.

Furthermore, since a reverse spread signal is obtained above the tracking loop, phase error in the reverse spread signal is feedback-controlled and can be curtailed to an extremely low level.

Figure 10:
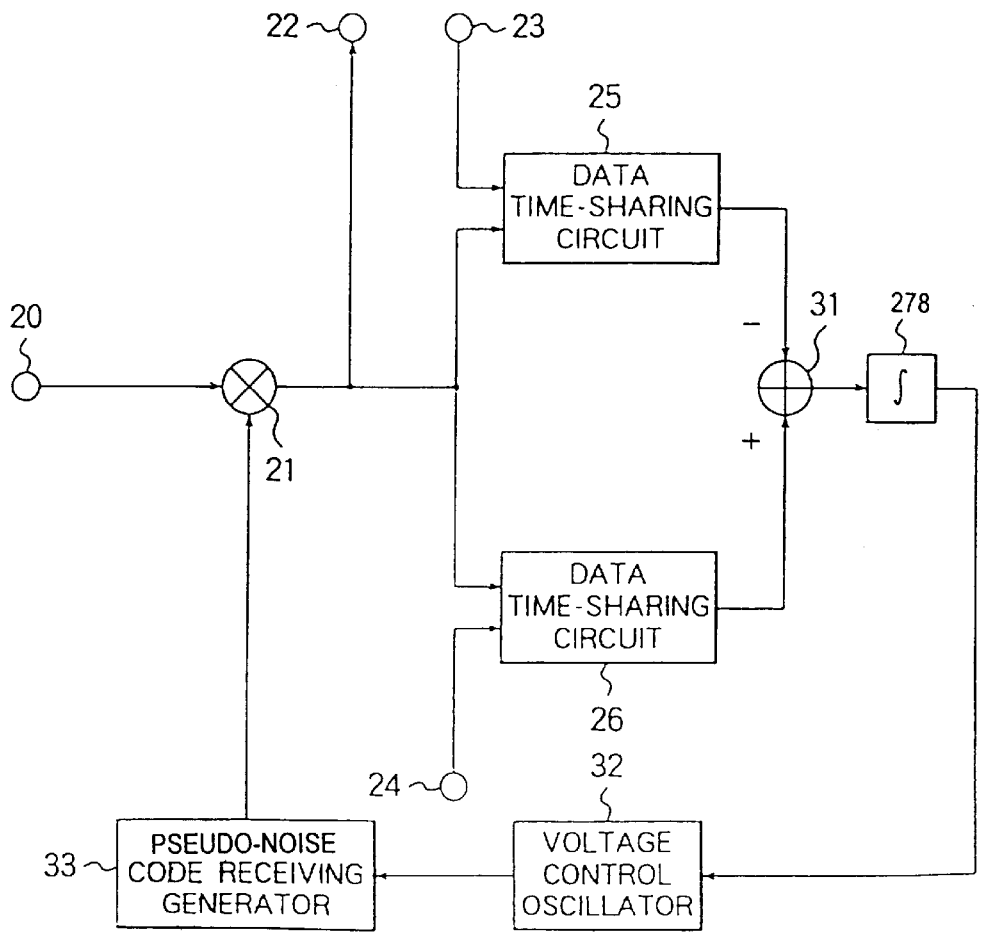
FIG. 10 is a block diagram explaining a second embodiment of the present invention.

A second embodiment of the present invention will be explained using the block diagram in FIG. 10. In this embodiment, the integrators used by the correlators 29 and 30 in the embodiment shown in FIG. 1 have been reduced to one each. The same numerals as in FIG. 1 have been used for the configured elements.

In this embodiment, integrators 27 and 28 used in the FIG. 1 embodiment are united to provide an integrator 278 after the calculator 31 and circuit scale is thus reduced.

Output from data time-sharing circuits 25 and 26 is added at the calculator 31 and is then passed through the integrator 278 to obtain a delay discriminating property. This is obvious from the linear form of integration in general mathematics. The signal outputted from data time-sharing circuit 25 is expressed by the function f1 (t) and the signal outputted from data time-sharing circuit 26 is expressed by the function f2 (t). Furthermore, if we assume that the integration period lasts from 0 to 1 function cycle length T, the delay discriminating properties of the FIG. 1 embodiment and of the present embodiment are expressed respectively as:

$$\int_0^T f1\,(t)\,dt + \int_0^T f2\,(t)\,dt \tag{6}$$

$$\int_0^T [f1\,(t) + f2\,(t)]\,dt \tag{7}$$

As equations (6) and (7) demonstrate, these are equal and a tracking apparatus with the same effects as in the first embodiment can thus be realized with integrator 278.

According to this embodiment, the operations of the two integrators 27 and 28 used in FIG. 1 can be executed by a single integrator by providing an integrator 278 after the calculator 31. Therefore, circuit scale can be reduced to suffice for one integrator.

The correlators used in the explanations of the first and second embodiments were correlators for a synchronous tracking apparatus of a spread spectrum receiver, but the correlator used here can also be applied for other purposes and a third embodiment of the invention will next be explained with reference to FIG. 11. The portions depicted in FIG. 1 are here given the same numerals.

Figure 11:
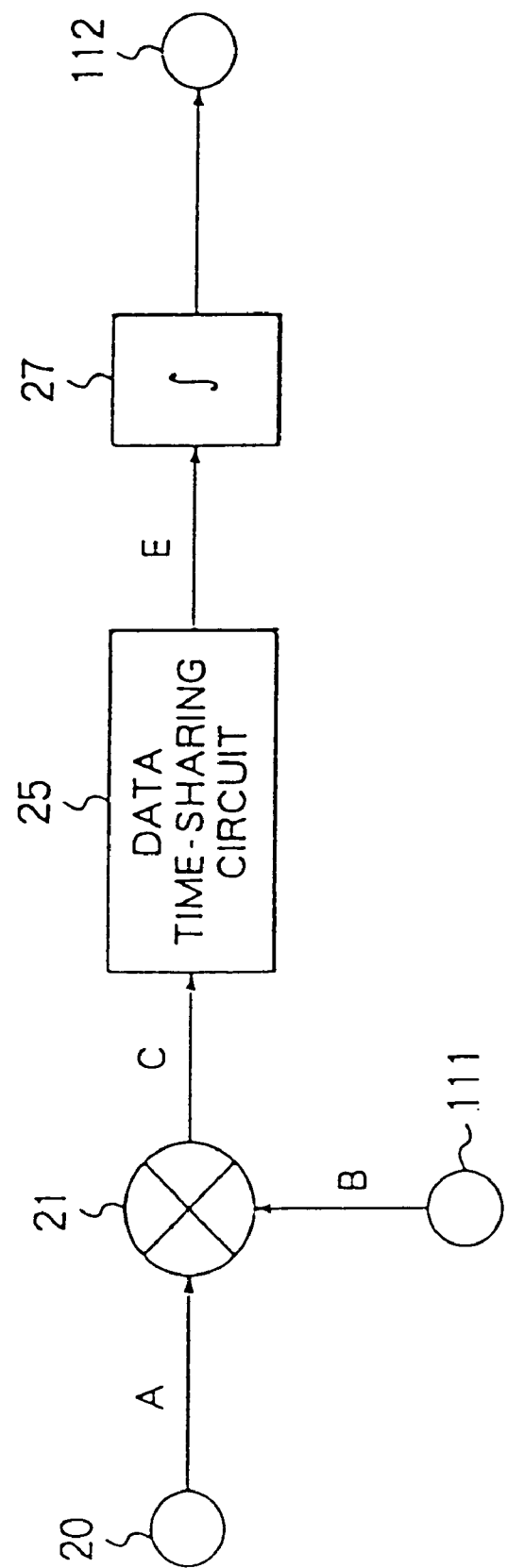
FIG. 11 is a block diagram explaining a third embodiment of the present invention.
Figure 12A:
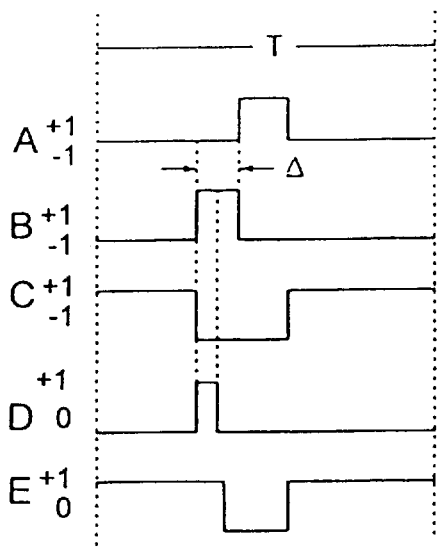
FIG. 12 is a signal waveform diagram explaining the operation of FIG. 11.
Figure 12D:
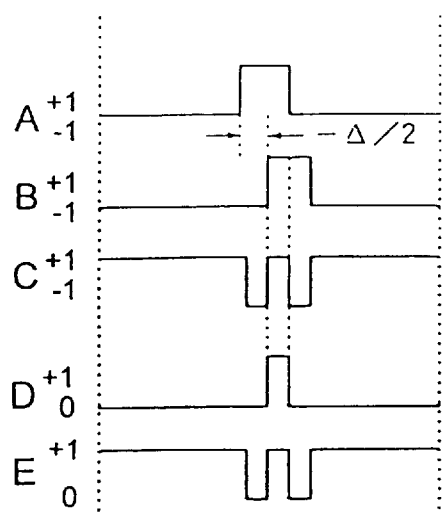
Figure 12B:
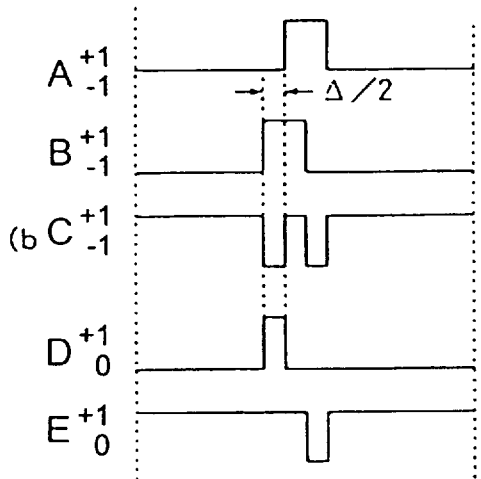
Figure 12E:
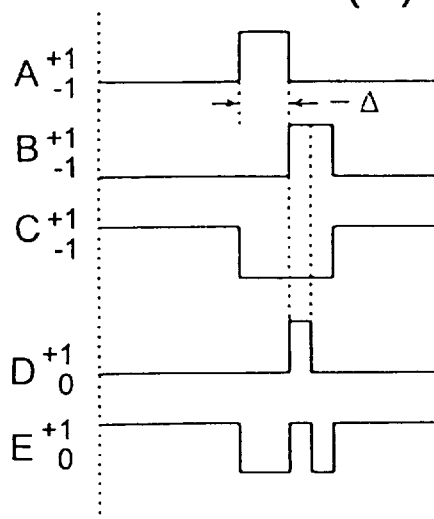
Figure 12C:
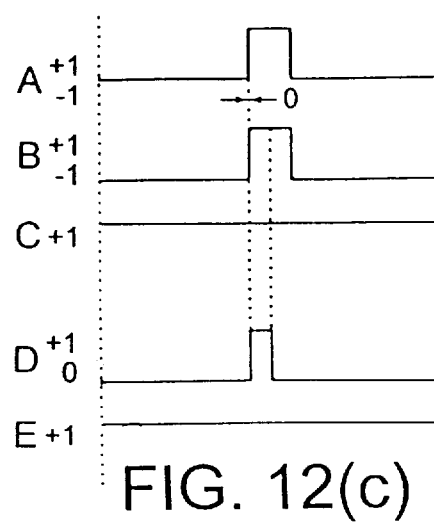

FIG. 11 shows one of the correlators with both FIG. 1 configurations 20 and 111 are input terminals, 21 is a multiplier, 25 is a data time-sharing circuit for time-sharing data, 27 is an integrator, 112 is an output terminal. Let us assume that two identical signals with different phases are inputted to input terminals 20 and 111. After multiplying the signals provided to input terminals 20 and 111 at the multiplier 21, the data are time-shared at the data time-sharing circuit 25, integrated at the integrator 27 and a correlation value between both inputted signals is thereby obtained at the output terminal 112.

FIG. 12 will be used to explain this operation. The amplitude values of the signal waveforms shown at A to C is set to ±1. However, in using the signal waveform shown at C for a logic operation, a binary operation is performed assuming that +1 in the amplitude value does not change, namely +1, and −1 in the amplitude value is 0. A is a signal S1 (t) inputted to input terminal 20 and B is a signal S2 (t) inputted to input terminal 111. Here, data time-sharing circuit 25 is controlled with a signal phase-synchronized to signal S2 (t) such as that shown at D. As a concrete example of the controlling method, assume that the multiplication result of signals A and B is outputted only during the period in which the signal shown at D is at −1 and that the multiplication result at C is deemed as 1 at all other periods. This is equivalent to time-sharing and portioning out the multiplication result when it is at 1.

It will next be explained what sort of correlation property is obtained when the phase difference t between signals A and B is changed. FIGS. 12 (a)~(e) respectively show the various signal waveforms obtained when the signal phase difference t of B in reference to the signal phase of A is at Δ, Δ/2, 0, −Δ.2 and −Δ. In FIG. 12 (a), during 1 cycle length T the multiplication result is not outputted only in the Δ/2 period which is phase-synchronized to B and therefore the output signal of the data time-sharing circuit 25 has the waveform depicted in FIG. 12 (e). FIGS. 12 (b)~(e) are then analyzed in the same way. Next, the period in which output is 0 is subtracted from the period in which output is 1 and a correlation value is obtained from the output terminal 112 by sharing the result by cycle length T. In FIG. 12 (*a*) the correlation value is 4/7, 6/7 in (*b*), 1 in (*c*), 5/7 in (*d*) and 4/7 in (*e*).

Figure 13:
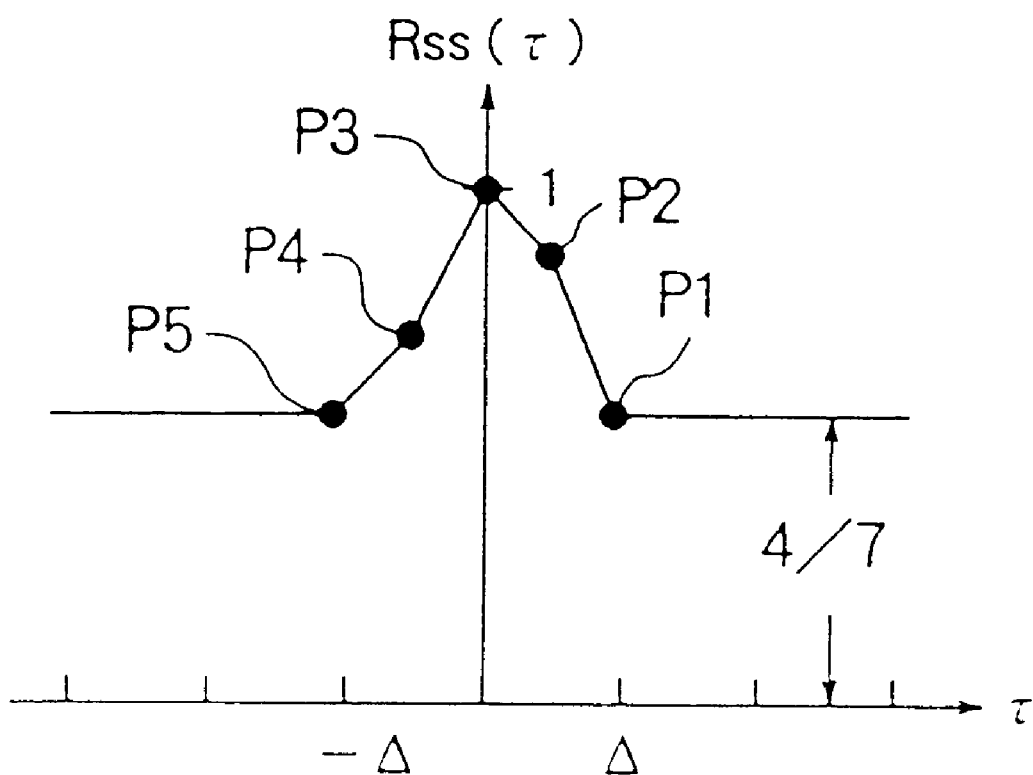
FIG. 13 is diagram showing a correlation curve obtained with the correlator in FIG. 11.
Figure 14A:
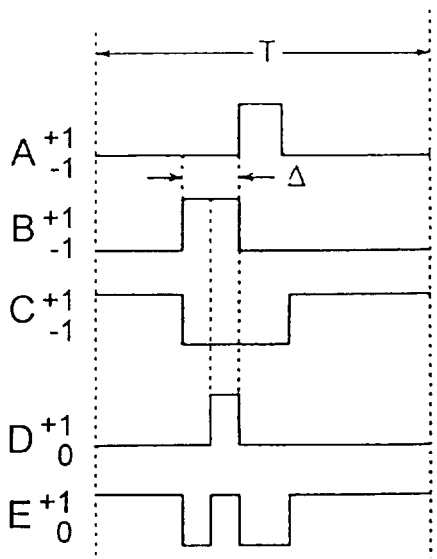
FIG. 14 is a signal waveform diagram explaining the operation of FIG. 11.
Figure 14D:
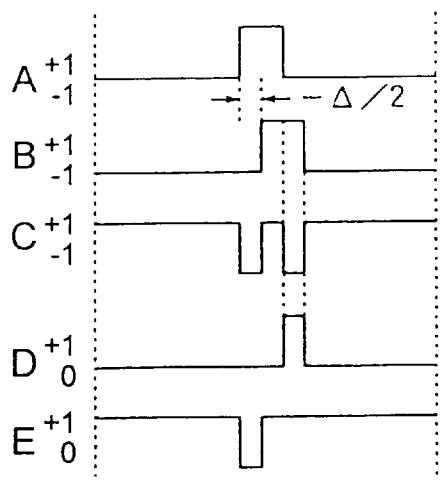
Figure 14B:
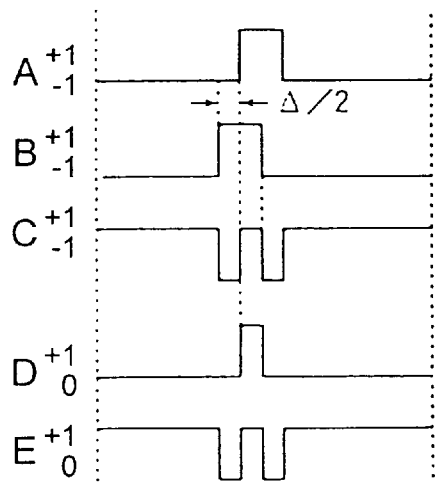
Figure 14E:
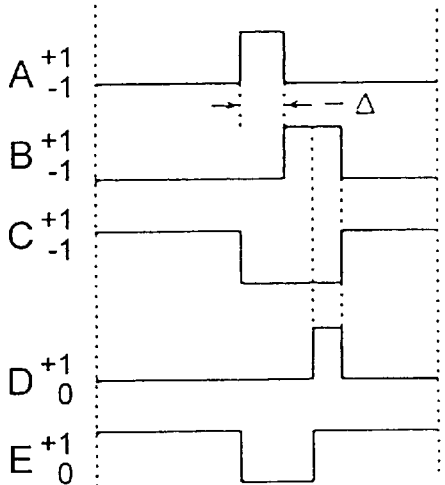
Figure 14C:
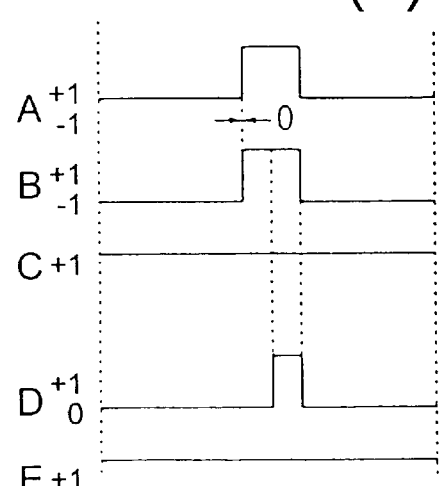

In the above analysis, a variety of correlation values were determined with representative values for $\tau$, but if $\tau$ is continuously varied, the correlation curve depicted in FIG. 13 is obtained. As in FIG. 38, in FIG. 13 the vertical axis expresses correlation value and the horizontal axis expresses the phase difference $\tau$ between 2 inputted signals. For reference, the correlation values obtained from FIGS. 12 (*a*)~(*e*) are also indicated in FIG. 13 by symbols P1~P5 respectively. In other words, a correlation curve can be rendered asymmetric with respect to a correlation value axis in which $\tau=0$ by providing a data time-sharing circuit 25.

Figure 15:
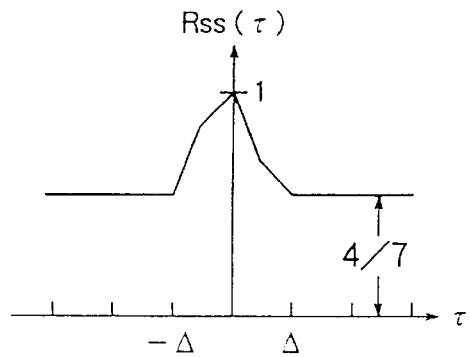
FIG. 15 is diagram showing a correlation curve obtained with the correlator in FIG. 11.

A signal with 1 period as $\Delta/2$ and phase synchronized to the start of signal S2 (t) was used in data time-sharing circuit 25 in the above explanation. Next, the same analysis will be carried out using a signal delayed by $\Delta/2$ with respect to the signal shown at FIG. 12D as the time-shared data signal. Like in FIG. 12, all the various signal waveforms are shown in FIG. 14 and the correlation curve is shown in FIG. 15. As is clear from the differences between the properties in FIG. 13 and FIG. 15 it is possible to create an asymmetrical correlation value by changing the timing at which data are time-shared.

Figure 16:
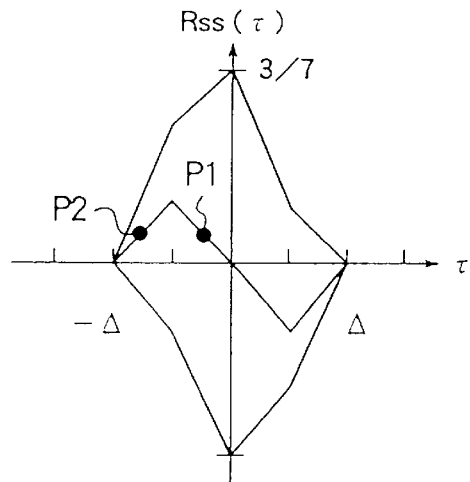
FIG. 16 is diagram showing a curve produced by subtracting the correlation curve in FIG. 13 from the correlation curve in FIG. 15.

Let us consider a case using this correlator in which the above-mentioned signal A shadows signal B. For this applied example, the correlation curve in FIG. 13 is subtracted from the correlation curve obtained through the above analysis shown in FIG. 15 to obtain the curve in FIG. 16. From this curve it can be seen that the correlation value is positive in the region where phase difference is $-\Delta$~0 and negative where phase difference is 0~$\Delta$. For instance, FIG. 16 P1 and P2 show a case in which the correlation value was 1/14. The P1 phase difference is $-\Delta/4$ and the P2 phase difference is $-3\Delta/4$ and so it can be seen that phase difference here is negative. Based on this, by moving the phase difference of signal B with respect to signal A in the plus direction, both can be matched quickly.

Since a conventional correlator had a curve which was symmetrical on both sides with respect to a correlation value axis wherein phase difference $\tau=0$, it was not possible to assess phase advance or phase delay from the correlation value. However, with a correlator of present invention is it possible to create a curve which is asymmetrical on both sides with respect to a correlation value axis wherein phase difference $\tau=0$, and phase advance or phase delay from the correlation value can be assessed. In particular, these correlation properties can be used as an extremely effective means in an application example where one signal is phase-synchronized to the other signal.

A concrete example of a data time-sharing circuit will next be explained using FIG. 17. Data time-sharing circuit 25 comprises an OR calculator 251 to which are inputted the output from a multiplier 21 and a timing signal inputted to a timing signal input terminal 252. The output from the OR calculator 251 is then inputted to an integrator 27.

Figure 17:
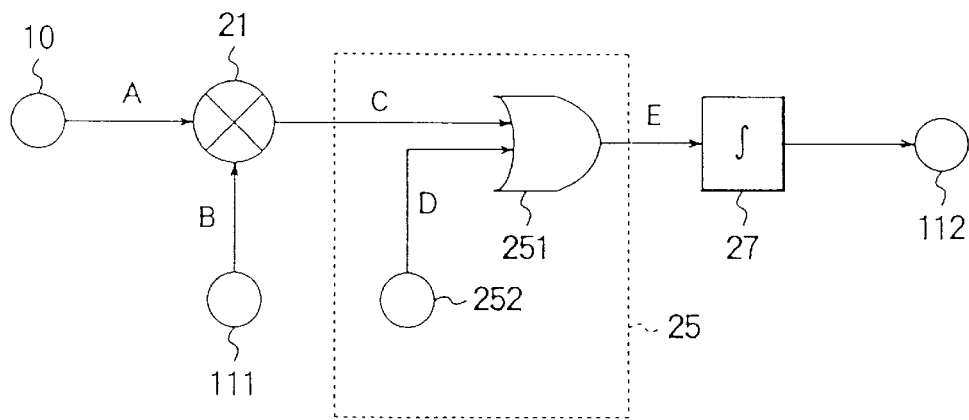
FIG. 17 is a block diagram explaining a concrete example of the time-sharing circuit depicted in FIG. 11.

With the exception of the data time-sharing circuit 25 in FIG. 17, the operation here was explained in FIG. 11. Therefore, only the operation of the data time-sharing circuit will be explained here.

Let us assume that two identical signals with different phases are inputted to input terminals 20 and 111. The multiplication result of the two signals provided has the signal waveform depicted in FIG. 12 C. This signal C of the multiplication result is inputted to one of the input terminals of the OR calculator 251 and a signal which has been phasesynchronized at input terminal 111 is inputted to the other input terminal. It is also assumed here that the signal shown at FIG. 12 D is inputted to the timing signal input terminal 252. Since the OR calculator 251 outputs at the L level only when both input signals are at the L level, an output signal waveform of the OR calculator 251 is equivalent to the signal waveform depicted in FIG. 12 E. Consequently, the correlation curve obtained is equivalent to that shown in FIG. 13.

Figure 18:
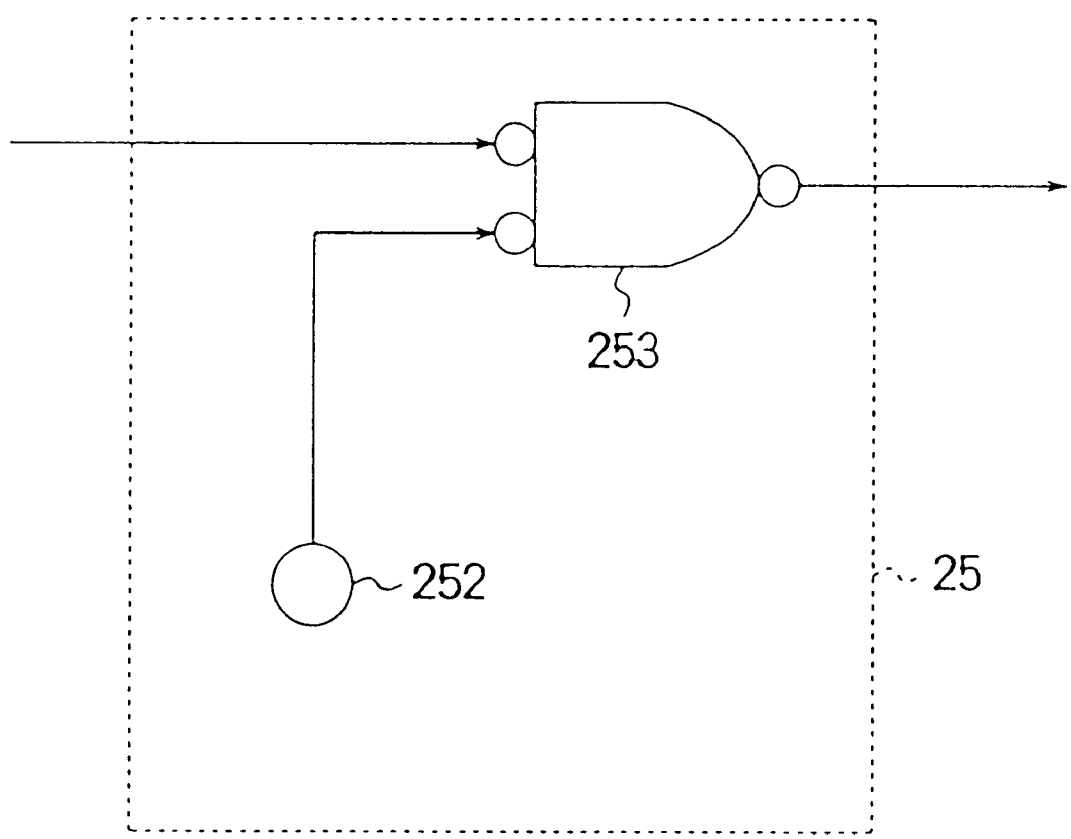
FIG. 18 is a block diagram explaining another concrete example of the time-sharing circuit depicted in FIG. 11.

Similarly, when the signal in FIG. 14 D is inputted to timing signal input terminal 252, the correlation curve obtained is equivalent to that shown in FIG. 15. Based on such an analysis, it is possible to create similar correlation properties by logical modification of the data time-sharing circuit 25. For instance, since OR calculation is equivalent to negative logic NAND calculation, the data time-sharing circuit 25 can be substituted with a negative logic NAND calculator 253 as shown in FIG. 18. It is obvious that a similar correlation curve will be obtained.

An example unlike the above embodiments in which the embodiment is applied to a synchronized shadowing circuit of a spread spectrum receiver will next be explained using FIG. 19. Prior to this explanation, a simple description of a spread spectrum communications system will be given and the processing required on both receiving and transmitting sides will be explained.

In a spread spectrum communications system, the voltage spectrum of a data signal to be transmitted is spread by multiplying the data signal by a pseudo-noise code at the transmitting side before transmission; at the receiving side, the spread spectrum is returned to its original form by multiplying the incoming signal once again by a pseudo-noise code identical to that used on the transmission side and the data signal is thus obtained. The pseudo-noise code multiplication processing performed on the transmission side is known as "spread processing" and the pseudo-noise code multiplication processing performed on the reception side as "reverse spread processing." This spread processing and reverse spread processing will next be explained with reference to FIG. 20.

FIG. 20 (*a*) shows spread processing performed on the transmitting side and (*b*) shows reverse spread processing performed on the receiving side. Here, the amplitude value of respective signal waveform shown A to C is set to ±1. A is a data signal, B is a pseudo-noise code, C is a transmission signal obtained from a multiplication result of A and B. For simplicity here it is assumed that data signal A is a digital signal which has a normal oscillation value of 1 and is one pattern of a pseudo-noise code obtained from a $3^{rd}$-order primitive polynomial. Moreover, T is 1 cycle length of a pseudo-noise code where 1 cycle length consists of 7 chips and the time for 1 chip is defined as $\Delta$. In other words, T=7$\Delta$.

Since data signal A has a value of 1, the transmission signal C formed by multiplying A by pseudo-noise code B is equal to pseudo-noise code B and this is transmitted from the transmitter. The receiver receives the transmitted signal and a data signal E is obtained by multiplying this received signal C by a pseudo-noise code identical to and at the same phase as that used on the transmitting side. As should be clear from the diagram, even when a pseudo-noise code identical to that used in the spread processing is used in the reverse spread processing, if for instance the multiplication timing (i.e. the phase) is different, signal E will not be identical to signal A and data cannot be reconstituted.

The receiver must therefore generate a pseudo-noise code already phase-synchronized to the pseudo-noise code sent from the transmitter and carry out shadowing. This is performed by a synchronous shadowing circuit, the operation of which will next be explained.

Figure 19:
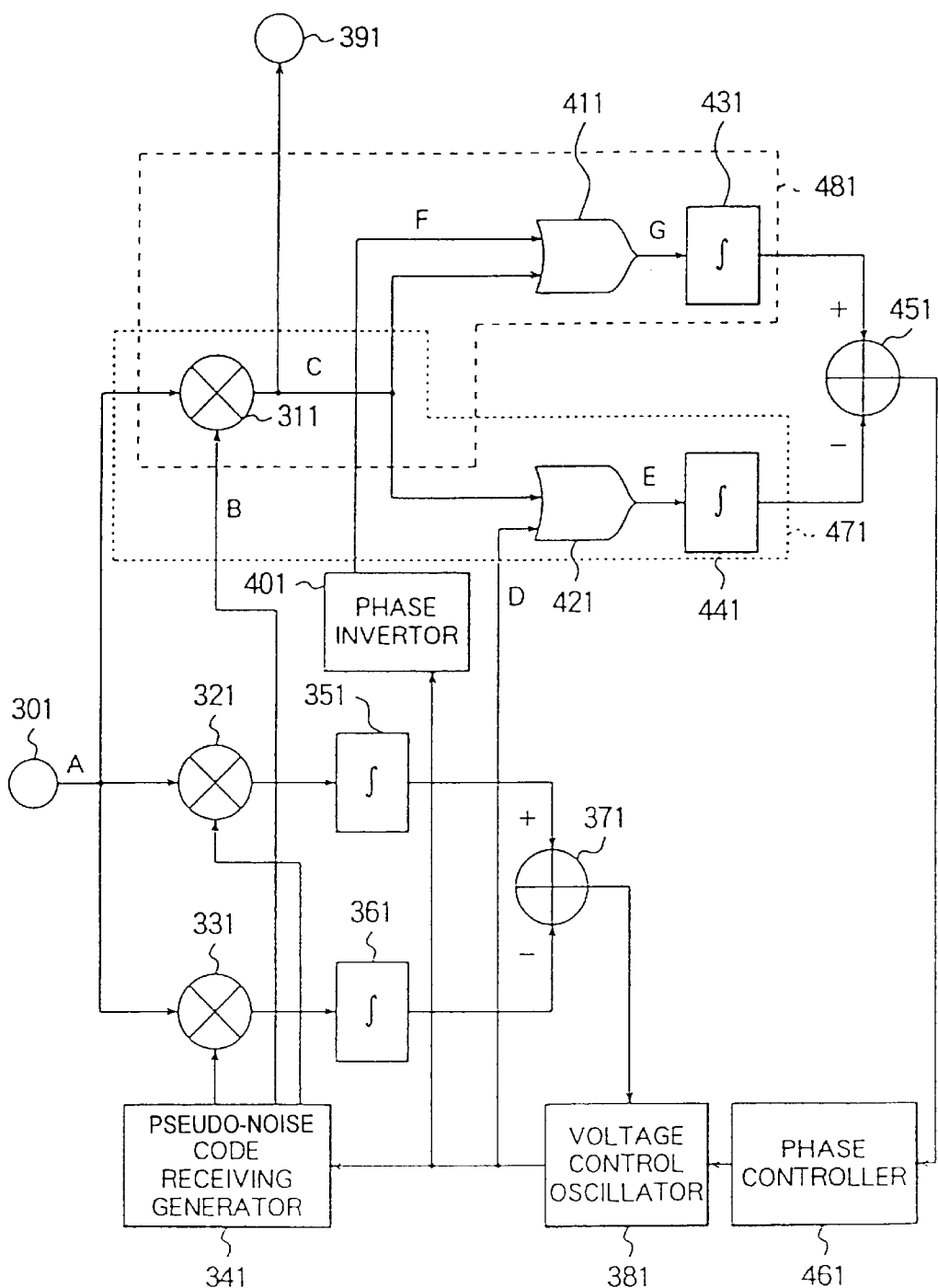
FIG. 19 is a block diagram explaining an application example of the present invention.
Figure 22A:
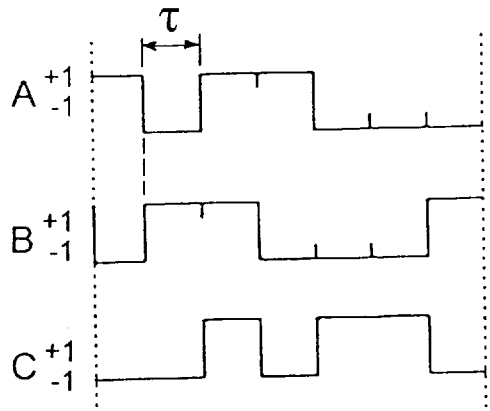
FIG. 22 is a signal waveform diagram of a pseudo-noise code and an output signal used in FIG. 21.
Figure 22D:
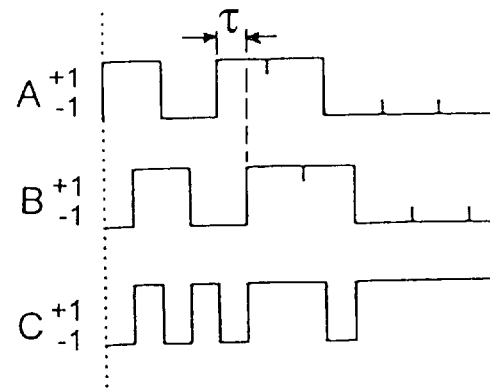
Figure 22B:
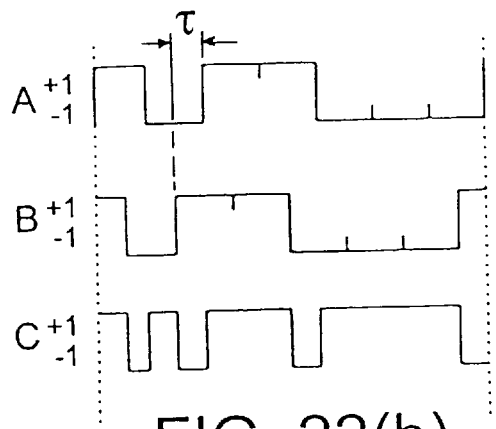
Figure 22E:
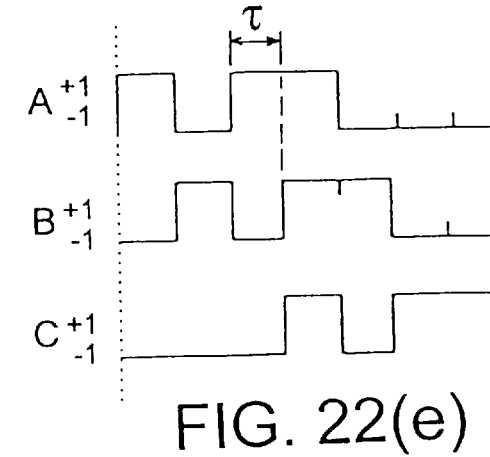
Figure 22C:
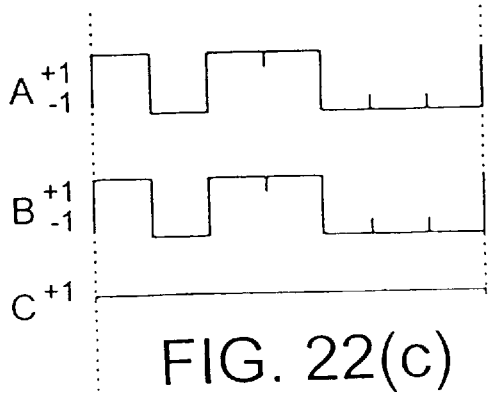

The synchronous shadowing circuit from FIG. 19 is shown in FIG. 21. The FIG. 21 circuit is a sliding correlation system synchronous shadowing circuit generally used in spread spectrum receivers.

301 is a receive signal input terminal, 311, 321, 331 are multipliers, 341 is a pseudo-noise code generator, 351 and 361 are integrators, 371 is a calculator, 381 is a voltage control oscillator, 391 is an output terminal for a reverse spread signal. The correlator included in FIG. 21 will first be explained and it is also assumed here that the signals used in spread processing performed at the transmission side are a data signal with a normal oscillation value of 1 and a $3^{rd}$-order pseudo-noise code as used in the above explanation.

The correlators in FIG. 21 consist of a multiplier 321 and an integrator 351 or a multiplier 331 and an integrator 361. These correlators are identical to those described in the conventional example, but since in this case the signals inputted to the correlators are pseudo-noise codes, the operation of a correlator when a pseudo-noise code is inputted thereto will now be explained once more in conjunction with a description of a correlation curve.

FIG. 22 shows two pseudo-noise codes to be inputted to a correlator and a multiplication result of both signals. Here, the amplitude value of respective signal waveform shown A to C is set to ±1. A pseudo-noise code inputted to one of the input terminals of the correlator is shown as A, the pseudo-noise code inputted to the other as B, the phase difference between A and B is shown as τ and (a)~(e) are signal waveforms obtained with representative τ values. Considered in relation to FIG. 21, we can interpret the diagram as follows: the pseudo-noise code shown at FIG. 22 A is inputted to the receive signal input terminal 301 and the pseudo-noise code shown at B is the output of the pseudo-noise code generator 341. Since FIG. 22 C depicts the multiplication result of pseudo-noise codes A and B it can thus be interpreted as the output signal of multiplier 321 or 331. Furthermore, the correlation value obtained by integrating the multiplication result signal C over 1 cycle length of a pseudo-noise code constitutes the output signal of integrator 351 or 361.

Signal waveforms depicted in FIGS. 22 (*a*)~(*e*) represent a variety of correlation values determined with representative values for τ, but a curve obtained when τ is continuously varied is depicted in FIG. 23. As described in the conventional example, this curve is symmetric on both sides with respect to a correlation value-axis in which τ=0.

Having understood a correlation property of a correlator, the shadowing operation of FIG. 21 will next be explained. The pseudo-noise code generator 341 in FIG. 21 has three output terminals, output signals from which are connected respectively to multipliers 311~331. It is assumed that pseudo-noise codes outputted from these three output terminals are out of phase with each other by Δ as FIG. 24 shows. With respect to FIG. 21, the phase relation between these pseudo-noise codes is as follows: code A is inputted to multiplier 331, code B is inputted to multiplier 311 and code C is inputted to multiplier 321. The correlation value obtained through multiplier 331 and integrator 361 is temporally ahead of the correlation value obtained through multiplier 321 and integrator 351 by an interval of 2Δ. The result is depicted in FIGS. 25 (*a*) and (*c*). Curve (a) is obtained from A, (c) is obtained from C. In FIG. 21, calculator 371 subtracts curve (a) from curve (c) thereby obtaining an S-shaped curve such as is shown in FIG. 26.

Figure 26:
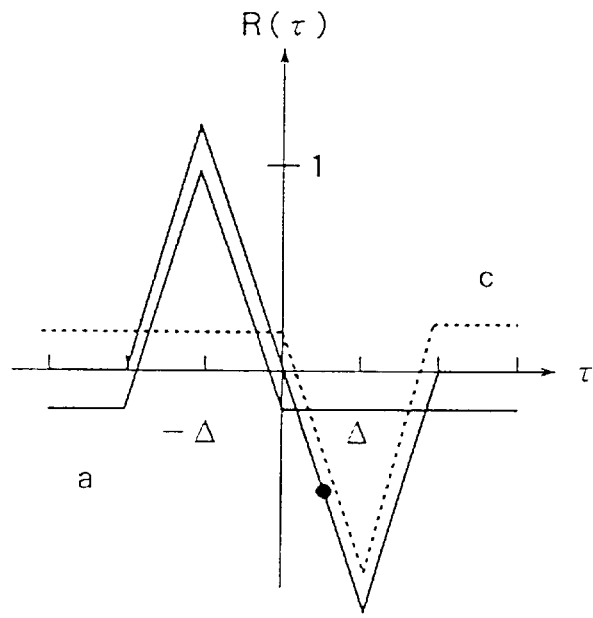
FIG. 26 is an explanatory diagram of a correlation curve of a spread spectrum receiver.

The vertical axis in FIG. 26 is the correlation value axis, and since this constitutes the signal extracted as voltage in an actual circuit, this voltage signal is used to control a voltage control oscillator 381 and by controlling the code speed of a pseudo-noise code outputted from the pseudo-noise code generator 341 in compliance with an oscillation frequency outputted from this voltage control oscillator 381 phase-shadowing can be executed at the point in the S-shaped curve where τ=0. Here it is assumed that the pseudo-noise code from pseudo-noise code generator 341 outputted at the multiplier 371 is in advance of the signal inputted to receiver input terminal 301 by Δ/2. The correlation value now obtained from multiplier 371 is indicated by the circle in FIG. 26.

Figure 27:
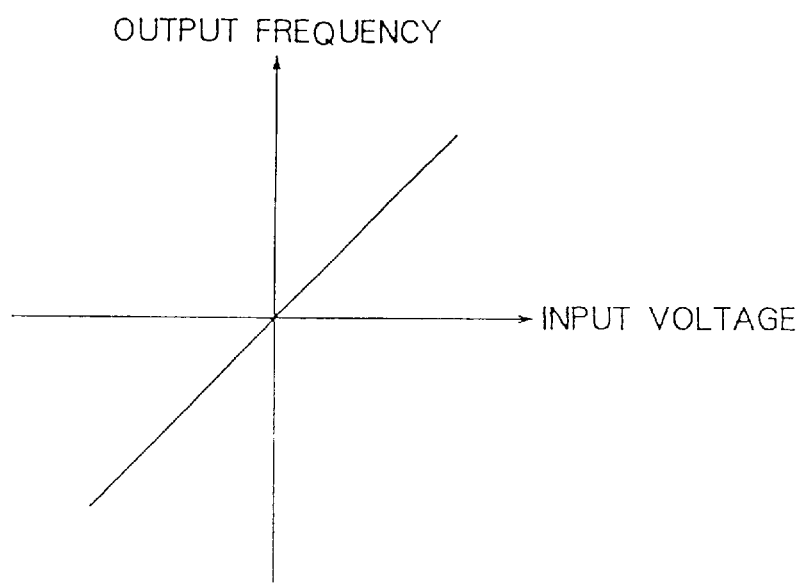
FIG. 27 is a curve diagram of the voltage control oscillator shown in FIG. 21.
Figure 28A:
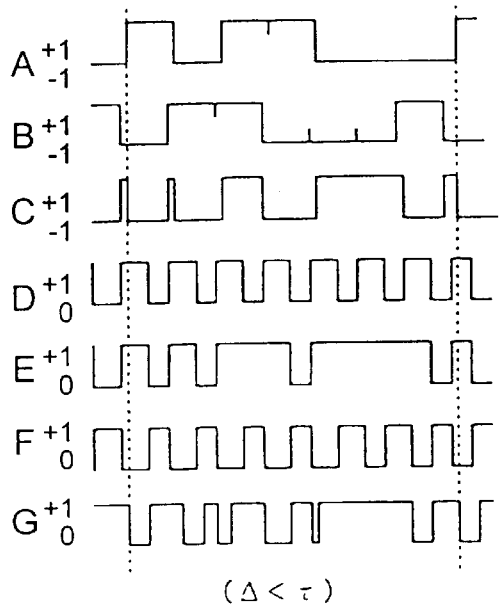
FIG. 28 is a signal waveform diagram to explain the operation of the first correlator shown in FIG. 19.
Figure 28C:
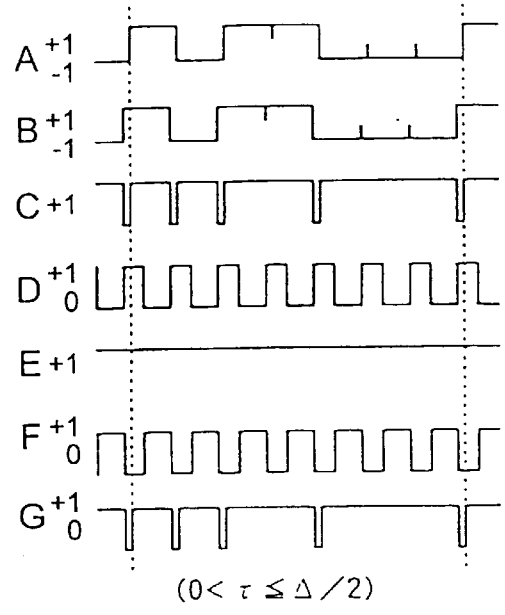
Figure 28B:
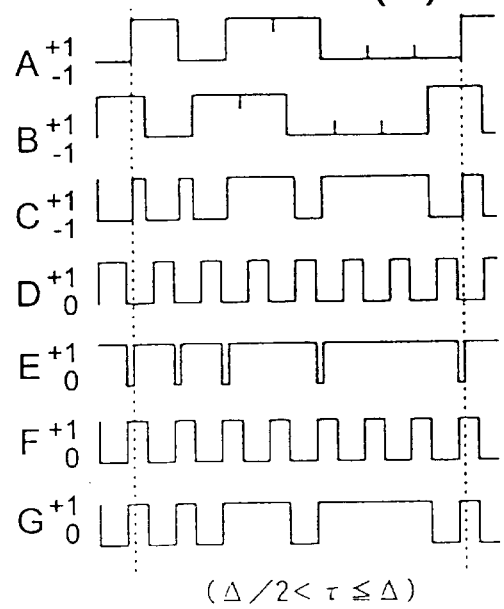
Figure 28D:
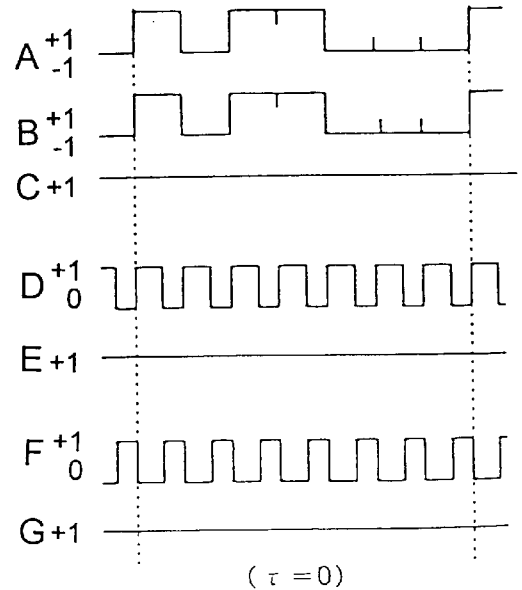

If the voltage control oscillator 381 property had a form such as that depicted in FIG. 27, the oscillation frequency outputted from the voltage control oscillator 381 would drop. If the pseudo-noise code generator 341 were then to generate a pseudo-noise code in compliance with a frequency outputted from this voltage control oscillator 381, the frequency of the pseudo-noise code outputted from the pseudo-noise code generator 341 would be lowered. In other words, the phase of the pseudo-noise code would be delayed with respect to the signal inputted to receiver input terminal 301. The phase difference is therefore controlled to have a value of 0.

The above explanation covered the shadowing operation, but the data signal is finally obtained at reverse spread output terminal 391. This can be understood as follows. By comparing the correlation properties at the point where τ=0 it can be seen that they are positioned at intervals of precisely half the amount of phase difference τ. This is the signal phase B of the pseudo-noise codes shown in FIG. 24. In other words, the pseudo-noise code shown at B in FIG. 24 matches the receive signal inputted to the input terminal 301 of the receiver and a reverse spread data signal can thus be extracted at the output terminal 391 of multiplier 311.

Using a synchronous shadowing circuit of the type described above, the receiver of a spread spectrum communicator generates on the receiver side a pseudo-noise code already phase-synchronized to a pseudo-noise code from the transmitting side and performs reverse spread processing to this signal. However, a signal which has actually been reverse spread processed is outputted from the output terminal 391 shown in FIG. 21. As is clear from this circuit diagram, the above-mentioned shadowing loop and the reverse spread output signal form an off-loop with no feedback from the reverse spread output signal to the shadowing loop and no matter how much the phase difference of the shadowing circuit is forced toward 0, the phase between the two signals multiplied at the multiplier 311 will not coincide as a result of a mismatch among the elements comprising FIG. 21 or a cable delay and such like and consequently the data signal cannot be perfectly decoded.

It may be suggested that the phase deviation from the reverse spread signal should be detected and on-loop phase control carried out. However, since a correlation curve obtained with a conventional correlator which merely integrates a reverse spread signal is symmetrical on both sides with respect to a correlation value axis in which τ=0, control is not possible since it is not clear whether the phase should be advanced or delayed.

FIG. 19 shows how a correlator of the present invention is applied for this kind of phase controlling. In the diagram, a correlator of this invention is provided to the synchronous shadowing circuit described in FIG. 21 in which a reverse spread output signal is phase controlled using on-loop controlling. Those components which also feature in FIG. 21 are indicated in FIG. 19 with the same numerals. An explanation of these will be omitted here. In FIG. 19, 401 is a phase invertor, 411 and 421 are OR calculators, 431 and 441 are integrators, 451 is a calculator, 461 is a phase controller, 471 is a first correlator, 481 is a second correlator.

Two correlators of the invention are provided in this application example. One is a first correlator 471 comprising integrator 311, OR calculator 421 and integrator 441; the other is a second correlator 481 comprising integrator 311, OR calculator 411 and integrator 431. The operation of the first correlator 471 will first be explained using FIGS. 28 and 29.

Figure 29A:
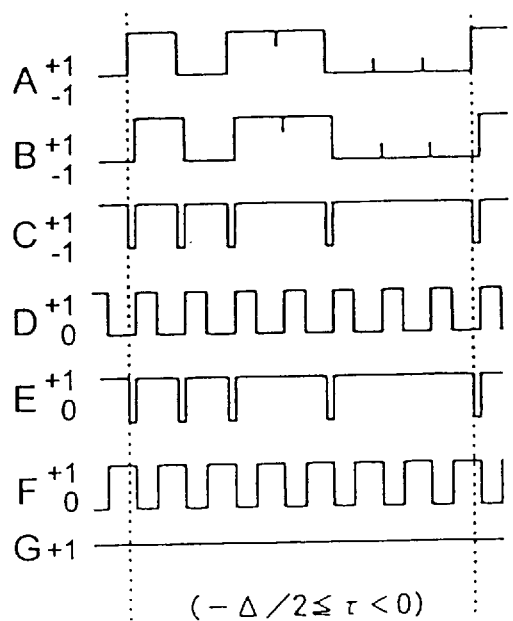
FIG. 29 is a signal waveform diagram to explain the operation of the first correlator shown in FIG. 19.
Figure 29C:
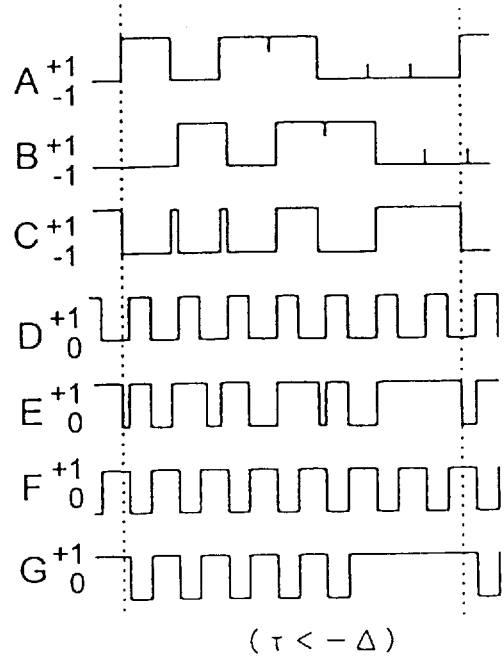
Figure 29B:
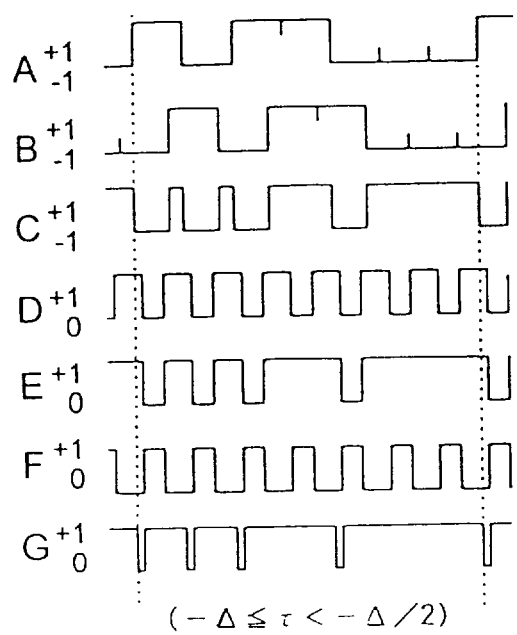

FIGS. 28 and 29 depict signal waveforms of each correlators, wherein a pseudo-noise code inputted to a correlator is one pattern of an M-sequence (M-series) code obtained from a $3^{rd}$-order primitive polynomial, T is 1 cycle length of the code, 1 chip is defined as $\Delta$ and the phase difference between 2 pseudo-noise codes is defined as $\tau$ as in the preceding explanations. A is a pseudo-noise code provided to the receiver input terminal 301, B is a pseudo-noise code provided to multiplier 311, C is the multiplication result of A and B, D is a clock signal outputted from the voltage control oscillator 381, E is an output signal of the OR calculation of C and D. In other words, by means of an OR calculator the data time-sharing circuit uses an output signal from the voltage control oscillator 381 which constitutes the drive signal for the pseudo-noise code as the signal phase synchronized to a pseudo-noise code.

FIGS. 28 (a)–(d) and FIGS. 29 (a)–(c) respectively show separate signal waveforms for cases when $\Delta<\tau$, $\Delta/2<\tau<\Delta$, $0<\tau<\Delta/2$, $\tau=0$, $-\Delta/2<\tau<0$, $-\Delta<\tau<-\Delta/2$, $\tau<-\Delta$. Since the calculations are multiplication and OR calculation, an explanation will be omitted and comments will be limited to the correlation property. The signal waveforms and the amplitude of each signal waveform A to G shown in FIGS. 28 and 29 are similar to those in FIGS. 2 and 3.

Figure 30A:
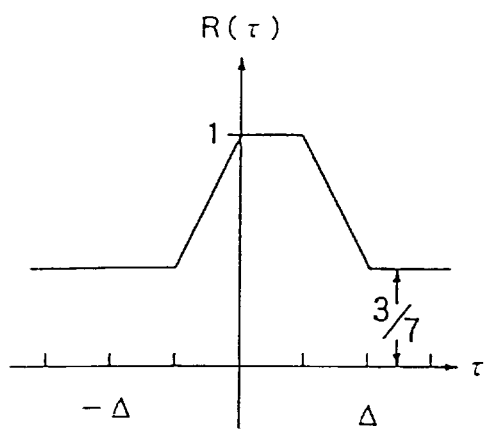
FIG. 30 is a diagram of curves obtained from the first correlator shown in FIG. 19.
Figure 30B:
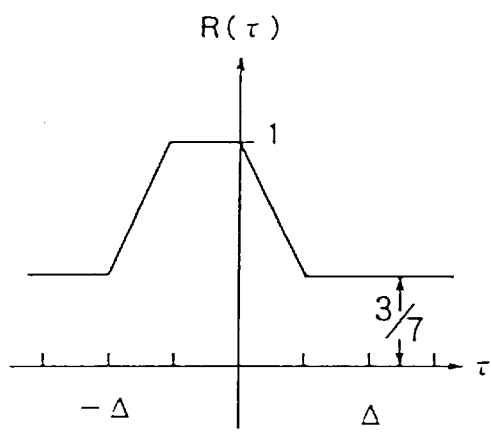

FIG. 30 (a) depicts a correlation curve obtained by the first correlator 471. The correlation value has a constant value of 3/7 in the regions where $\tau<-\Delta$ and $\Delta<\tau$, a linear increase during the region where $-\Delta/2<\tau<0$, a constant value of 1 when $0<\tau<\Delta/2$, and a linear decrease when $\Delta/2<\tau<\Delta$. This property can be interpreted as follows. If we consider that the data time-sharing circuit uses a pseudo-noise code drive signal, it follows that the data is reduced to half of one chip when the clock signal duty is 50%. In other words, data during the 0~$\Delta/2$ region is thinned (superseded) and data during the region $\Delta/2$~$\Delta$ region is outputted.

FIG. 23 depicted a correlation curve for non-time-shared data, and if the correlation value for the period in which data are obtained is left unaltered and the correlation value for the period in which data are thinned (superseded) is constant, the curve depicted in FIG. 30 (a) is obtained.

The second correlator 481 inverts the phase of a timing signal for time-sharing data, namely the clock signal shown at D in FIGS. 28 and 29, at phase invertor 401 and inputs the result to the OR calculator 411. The signal waveform thereby produced is shown at F in FIGS. 28 and 29. G is an OR calculation result of C and F. The correlation curve of this second correlator 481 is shown at FIG. 30 (b). This curve is none other than the curve at (a) delayed by $\Delta/2$.

Figure 31:
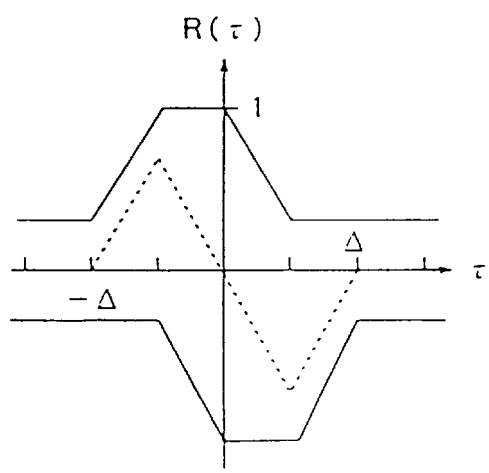
FIG. 31 is a diagram of a correlation curve obtained from FIG. 19.

Therefore, the correlation curve obtained from calculator 451 is that shown in FIG. 31. This curve is none other than the S-shaped curve on the time axis required for the shadowing operation. It is thus possible to create a correlation value capable of assessing phase advance or delay using a reverse spread output signal. Once this correlation value has been created, the phase controller 461 can then assess the output voltage of calculator 451 and the reverse spread signal can be on-loop controlled by controlling the feedback of the voltage control oscillator 381.

For reference purposes, the correlation value of the curve depicted in FIG. 30 (a) will be expressed with an equation. If the degree of the primitive $3^{rd}$-order polynomial of the M-sequence code which constitutes the pseudo-noise code inputted to the correlator is expressed as k, the maximum correlation value is expressed by equation (6) and the minimum value by equation (7).

Maximum Correlation Value: $[1/(2^k-1)] (2k-1)$     (6)

Minimum Correlation Value: $[1/(2^k-1)] [(2k/2)-1]$     (7)

Figure 32:
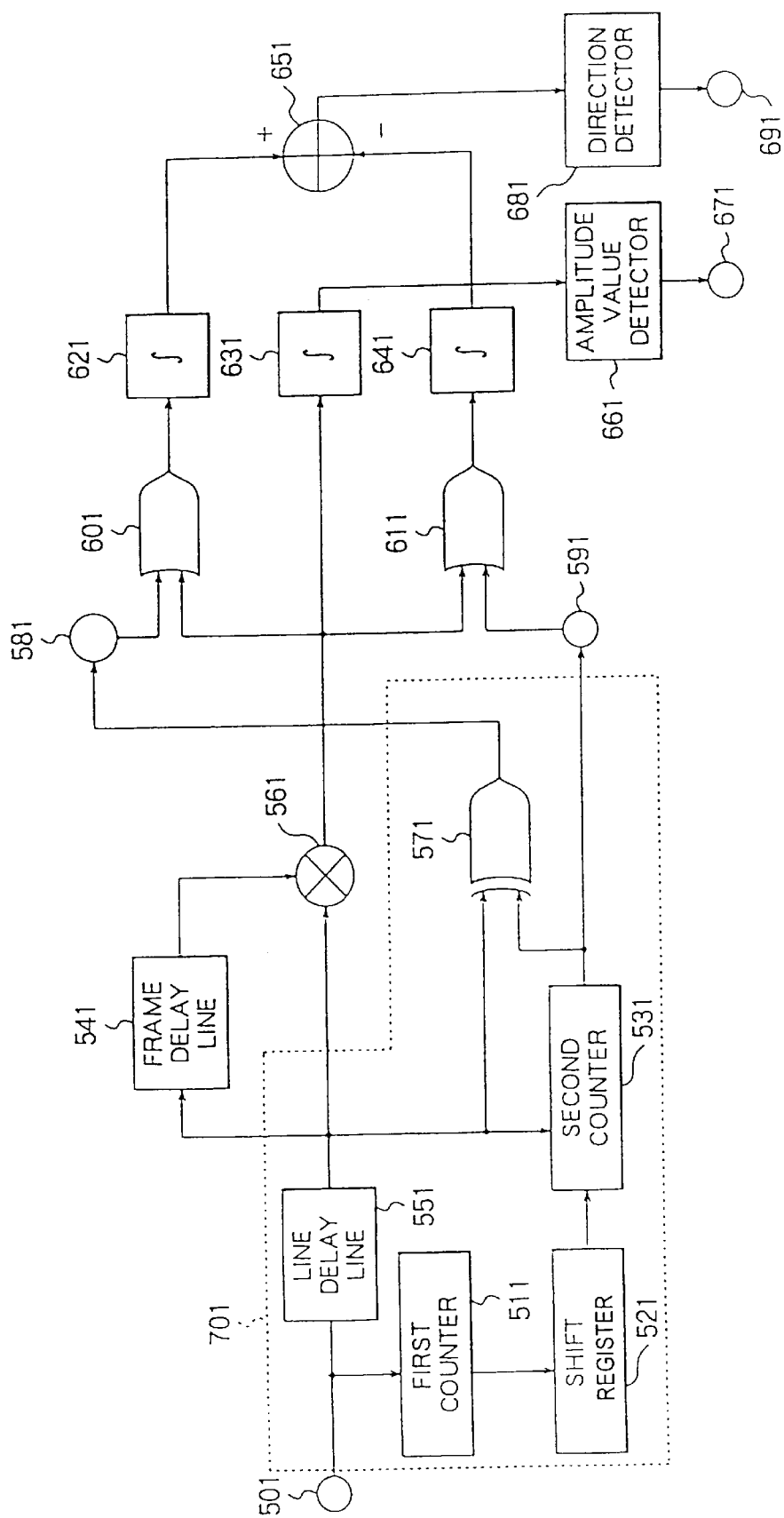
FIG. 32 is a block diagram to explain a second application example of the present invention.
Figure 33A:
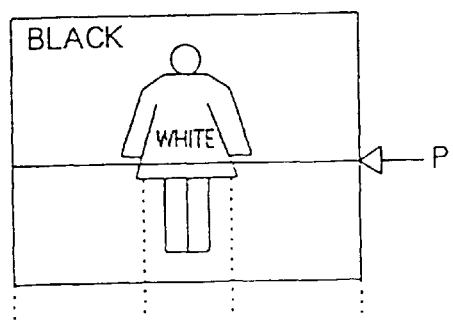
FIG. 33 is a diagram explaining the operation of FIG. 32.
Figure 33C:
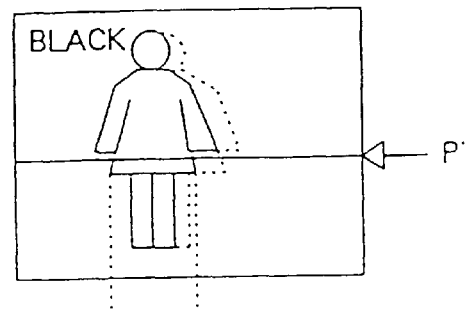
Figure 33B:
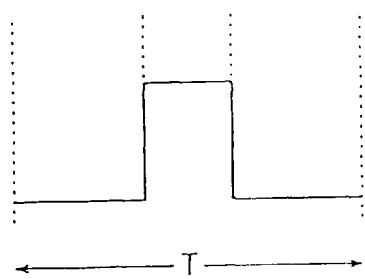
Figure 33D:
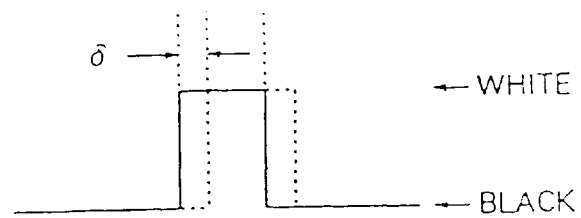
Figure 37:
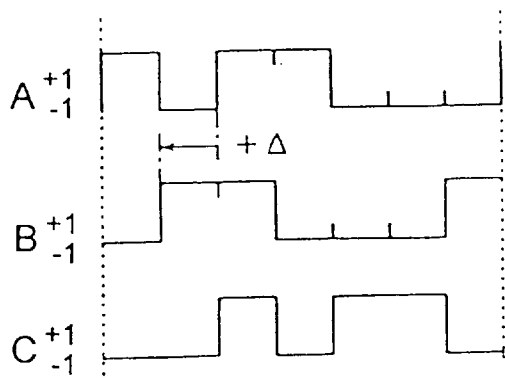
FIG. 37 is a diagram of a signal waveform to explain the operation of FIG. 35.
Figure 37:
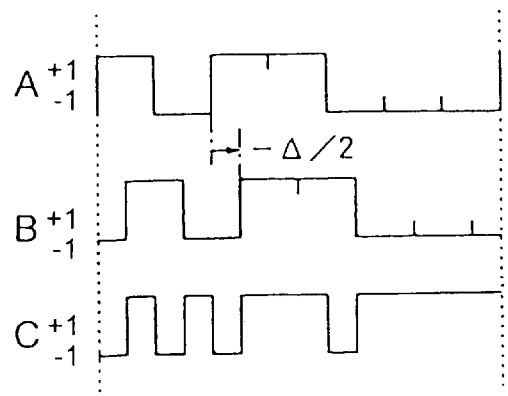
Figure 37:
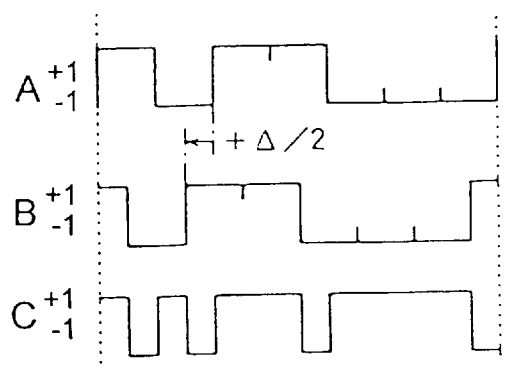
Figure 37:
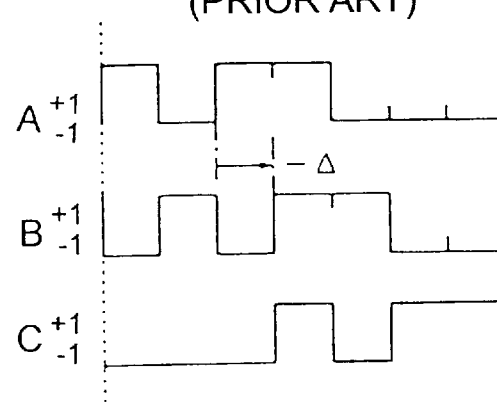
Figure 37:
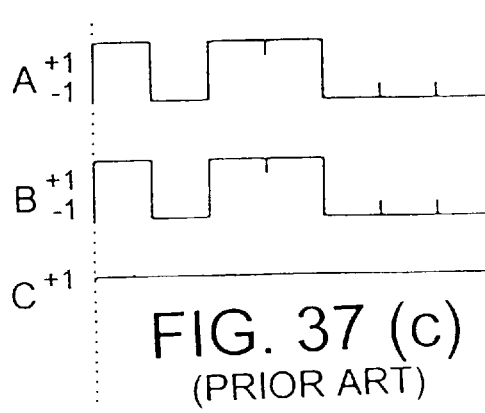

A second application example of the present invention will now be explained using the block diagram in FIG. 32. FIG. 32 is a system for detecting the amount of movement and the direction of movement of an image which is used as an image movement detector before explaining this diagram, a simple explanation will be given of the image and video signal shown in FIG. 33.

FIG. 33 (a) depicts a video signal displayed on a television. To simplify understanding, the image displayed is of a human figure dressed in white against a black background. FIG. 33 (b) shows 1 line of a video signal corresponding to position P in FIG. 33 (a). An actual 1 line of a video signal contains a horizontal synchronizing signal, but this case shows only the period in which the video signal is displayed on the television screen. Since the brightness of a video signal is expressed by the direct current voltage of the video signal (brightness signal), the black background on the screen is expressed with the black level of the video signal and the white figure is expressed with the white level. The video period is defined here as T and the width of the figure (i.e. the white level video period) as $\Delta$.

FIG. 33 (c) shows a video signal delayed by 1 frame from the FIG. 33 (a) video signal, in which the human figure has moved to the left. The image indicated by the dotted line is the image of the previous frame and the complete line indicates the present image. FIG. 33 (d) shows 1 line of a video signal corresponding to position P' in FIG. 33 (c), with the video signal period defined as T.

The operation of FIG. 32 will now be explained. In this diagram, 501 is a video signal input terminal, 511 is a first counter, 521 is a shift register, 531 is a second counter, 541 is a frame delay line, 551 is a line delay line, 561 is a multiplier, 571 is an XOR calculator, 581 and 592 are timing signal input terminals, 601 and 611 are OR calculators, 621~641 are integrators, 651 is a calculator, 661 is an amplitude value detector, 671 is an output terminal of the amplitude value detector, 681 is a direction detector, 691 is an output terminal of the direction detector, 701 is a timing signal generating circuit.

The timing signal generating circuit 701 generates a timing signal for time-sharing data necessary for creating correlation curve asymmetry and comprises the line delay line 551, first counter 511, shift register 521, second counter 531 and XOR calculator 571.

After being inputted to the video signal input terminal 501, a video signal is inputted, to the line delay line 551 and the first counter 511 within the timing signal generating circuit 701. The first counter 511, the shift register 521 and the second counter 531 are here set in the following way.

Firstly, the first counter 511 is deemed as an up-counter and the second counter 531 as a down-counter. In addition, a clock signal is inputted to the first counter 511, the shift register 521 and the second counter 531. This clock signal instigates both the counting operations of the counters and the shifting operation of the shift register. This clock signal can use a subcarrier frequency and such like for color signal processing a video signal, for instance.

Next, setting is carried out so that the first counter 511 commences count-up when the input signal changes to High and ceases counting when the signal reverts to Low, the second counter 531 commences countdown and outputs at the High level when the input signal changes to High and outputs at the Low level when counting ceases, and both counters are reset at the start-edge of the horizontal synchronizing signal in the video signal. Setting is further carried out so that the shift register 521 reads out the data of the first counter 511 at the end-edge of the horizontal synchronizing signal and the second counter 531 reads out the data from the shift register 521 at the start-edge of the horizontal synchronizing signal.

The series of operations of the timing signal generating circuit 701 will next be explained sequentially and chronologically. First, when the video signal provided to the video signal input terminal 501 rises to the H level, the first counter 511 commences count-up and ceases counting when the video signal changes to the L level after Δ time has elapsed. The shift register 521 reads out this count data at the end-edge of the horizontal synchronizing signal and the data is data-shifted at the next clock. The second counter 531 reads out the data-shifted data at the start-edge of the horizontal synchronizing signal and when the video signal which has passed through the line delay line 551 rises to the H level, the second counter 531 simultaneously commences countdown and outputs at the H level, and when the second counter 531 ceases counting it simultaneously changes its output to the L level. Since the video signal from the line delay line 551 and the output having width of Δ/2 from the second counter 531 synchronize to the start of this signal are inputted to the XOR calculator 571, the XOR calculator 571 outputs a signal with a width of Δ/2 which starts at a width of Δ/2 after the start of the video signal.

In other words, the width Δ of the human figure is measured from the video signal provided to the video signal input terminal 501 and this value is halved and read into the second counter 531. Meanwhile, the video signal which is to be measured to obtain the width of the figure is delayed by 1 line at the line delay line 551 and inputted to the second counter 531. When the video signal from the line delay line 551 changes to the H level, the second counter 531 simultaneously outputs at the H level and changes to the L level after a period with a width of Δ/2. The XOR calculator 571 therefore outputs a signal with a width of Δ/2 which starts simultaneous with the end of the output from the second counter 531.

A method of time-sharing data from a video signal using a timing signal obtained in the manner described above will next be explained.

A video signal which has passed through the line delay line 551 and a video signal delayed from this signal by 1 frame are inputted to multiplier 561. These signals differing in time by 1 frame are multiplied together at the multiplier 561 and inputted to integrator 631 and one of the input terminals of OR calculators 601 and 611. The output of integrator 631 obtains a correlation curve symmetrical on both sides with respect to a correlation value axis in which the phase difference between 2 input signals is 0 as in a conventional correlator. In contrast, OR calculators 601 and 611 constitute a data time-sharing means for obtaining a correlation curve asymmetrical on both sides and the timing signal generating circuit 701 generates a timing signal for time-sharing data.

FIG. 34 depicts the timing relation between these signals FIG. 34 (*c*) is the same as FIG. 33 (*c*) and shows the present image (indicated by a complete line) and the image at 1 frame prior to that (indicated by a dotted line). FIG. 34 (*b*) shows a 1-line video signal period from the video signal at 1 frame prior to the present video signal, and is a video signal outputted from the frame delay line 541. FIG. 34 (*d*) shows a 1-line video signal period from the present video signal and is a video signal outputted from the line delay line 551.

A in FIG. 34 (*a*) is a signal obtained by multiplying FIGS. 34 (*b*) and (*d*) and is outputted from multiplier 561. B is a timing signal outputted from the second counter 531 and D is a timing signal outputted from the XOR calculator 571. C is the result obtained by time-sharing data from the multiplied video signal A according to the timing signal shown at B and is outputted from OR calculator 611. Furthermore, E is the result obtained by time-sharing data from the multiplied video signal A according to the timing signal shown at D and is outputted from OR calculator 601.

According to this configuration, the output signal of the multiplier 561 is inputted to the integrator and therefore the output of integrator 631 exhibits a correlation curve which is symmetrical on both sides with respect to a correlation value axis where the difference between a present signal and a signal 1 frame prior to this signal is 0. Alternatively, by integrating signals which have been separately data time-shared at OR calculators 611 and 601 in integrator 641 or integrator 621, the resultant output exhibits a correlation curve which is asymmetrical on both sides with respect to a correlation value axis where the difference between a present signal and a signal 1 frame prior to this signal is 0.

Let us determine the correlation values outputted from each of the integrators 621~641 with the time difference between the present video signal and a signal 1 frame prior to this as δ. A correlation value from integrator 631 is first worked out from the signal waveform at A in FIG. 34 (*a*). The correlation value is obtained by subtracting the Low period of the multiplication result from the High period and by sharing this by 1 cycle length T. This is expressed by equation (8).

$$A: 1-(4\delta/T) \tag{8}$$

Similarly, correlation values obtained from integrators 641 and 621 are expressed by equations (9) and (10) respectively.

$$C: (1/2)[1-(4\delta/T)] \tag{9}$$

$$E: 1-(4\delta/T) \tag{10}$$

In a video signal, the video picture pattern differs at each frame according to the elements forming the image and so a continuous correlation property is seldom obtained. Nevertheless, the correlation property is obtained of course logically the same as that explained in FIG. 23. In other words, a correlation curve symmetrical on both sides with respect to a correlation value axis in which time difference is δ is obtained from the output terminal of integrator 631 and correlation properties similar to those depicted in FIGS. 13 and 15, namely curves asymmetrical on both sides with respect to a correlation value axis in which time difference is d are obtained from integrators 641 and 621. The asymmetry of these correlation curve is apparent from the differing correlation values obtained from the above-mentioned equations (9) and (10). The calculator 651 subtracts the integrator 641 output from the integrator 621 output to obtain a correlation curve similar to that in FIG. 16.

In other words, when there is image movement (time difference δ) between a present video signal and a video signal 1 frame prior to this signal, if the image movement distance (time difference δ) is determined by detecting a correlation value at an amplitude value detector 661 and the positivity or negativity of the correlation value is assessed at a direction detecting circuit 681, the direction of the image movement can thereby be determined. Movement distance and movement direction are obtained respectively from the output terminal 671 of an amplitude value detector and the output terminal 691 of a direction detecting circuit 681; these data can be used to perform appropriate image processing based on the distance and direction of the movement and can also be applied in predicting the distance and direction of probable future movement of a video image.

Since conventional correlators have been able to assess only movement distance and not movement direction, it has been beyond their capability to perform appropriate processing to a moving video signal portion. However, a correlator of the present invention also enables us to assess the movement direction of a video signal. Consequently, when a circuit or such like for carrying out tertiary brightness signal and color signal division processing is used, appropriate image movement processing can be performed.

As explained above, a correlator of this invention makes it possible to create a curve asymmetrical on both sides with respect to a correlation value axis in which the phase difference between signals inputted to the correlator is 0 and is capable of assessing the advance or delay of the phase and also the direction in which phase has altered. Therefore, when a correlator of this invention is applied to a synchronizing shadowing circuit in a spread spectrum communications system receiver for instance, conventional impossible on-loop phase control becomes possible and as a result phase distortions in reverse spread signals can be curtailed to an extremely low level.

Furthermore, when the correlator is applied to a video signal processing circuit, it becomes possible to detect image movement direction which has conventionally been impossible and to predict video signal movement. These functions can for instance be applied to tertiary brightness signal and color signal division processing and moving image shadowing systems such as camera movies.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A synchronous tracking apparatus of a spread spectrum receiver for receiving a signal in which data have been spread based on a pseudo-noise code for transmitting, comprising:

means for obtaining a first and a second correlation value by obtaining time division data shared over the same time axis from a signal obtained by receiving a signal in which data have been spread based on a pseudo-noise code for transmitting and by multiplying the received signal and a pseudo-noise code for receiving;

means for obtaining a delay discriminating property by subtracting one of the correlation values from the other; and means for controlling the frequency of the pseudo-noise code for receiving based on the delay discriminating property and synchronously tracking the pseudo-noise code for receiving with the pseudo-noise code for transmitting.

2. A synchronous tracking apparatus of a spread spectrum receiver for receiving a signal in which data have been spread based on a pseudo-noise code for transmitting, comprising:

means for obtaining a first correlation value by performing an operation using a pseudo-noise code for receiving and a received signal in which data have been spread based on a pseudo-noise code for transmitting, wherein each pseudo-noise code includes a plurality of chips, and wherein the correlation value has a correlation curve that is flat at a maximum value across a given 1-chip segment;

means for obtaining a second correlation value having a correlation curve that is flat at a maximum value across a given 1-chip segment;

means for obtaining a delay discriminating property by subtracting the second correlation value from the first correlation value; and means for controlling the frequency of the pseudo-noise code for receiving based on the delay discriminating property in order to synchronize the pseudo-noise code for receiving with the pseudo-noise code for transmitting.

3. A synchronous tracking apparatus of a spread spectrum receiver for receiving a signal in which data have been spread based on a pseudo-noise code for transmitting, comprising:

means for obtaining a a first correlation value by receiving a signal in which data have been spread based on a pseudo-noise code for transmitting, multiplying the received signal by a pseudo-noise code for receiving that includes a plurality of chips, phase-synchronizing the received signal and the pseudo-noise code for receiving, and time-sharing and totaling data from this multiplied signal based on a first signal which alternates between an H level and an L level at a 1-chip interval;

means for obtaining a second correlation value by time-sharing and totaling data based on a second signal which is inversely phased in relation to the first signal;

means for obtaining a delay discriminating property by subtracting the second correlation value from the first correlation value; and means for controlling the frequency of the pseudo-noise code for receiving based on the delay discriminating property in order to synchronize the pseudo-noise code for receiving with the pseudo-noise code for transmitting.

4. A synchronous tracking apparatus of a spread spectrum receiver for receiving a signal in which data have been spread based on a pseudo-noise code for transmitting, comprising:

a first data time-sharing means wherein, in addition to phase-synchronizing with a signal obtained by receiving a signal in which data have been spread based on a pseudo-noise code for transmitting and multiplying this received signal with a pseudo-noise code for receiving that includes a plurality of chips, data is time-shared based on a first signal which alternated between an H level and an L level at a 1-chip interval of the pseudo-noise code for receiving;

a first integrator which integrates a signal outputted from the first data time-sharing means, to obtain a first correlation value;

a second data time-sharing means for time-sharing data based on a second signal which is inversely phased in relation to the first signal;

a second integrator which integrates a signal outputted from the second data time-sharing means, to obtain a second correlation value;

a calculator for obtaining a delay discriminating property by subtracting the second correlation value from the first correlation value; and means for controlling the frequency of the pseudo-noise code for receiving based on the delay discriminating property and synchronously tracking the pseudo-noise code for receiving with the pseudo-noise code for transmitting.

5. A synchronous tracking apparatus of a spread spectrum receiver for receiving a signal in which data have been spread based on a pseudo-noise code for transmitting, comprising:

a first data time-sharing means wherein, in addition to phase-synchronizing with a signal obtained by receiving a signal in which data have been spread based on a pseudo-noise code for transmitting and multiplying this received signal with a pseudo-noise code for receiving that includes a plurality of chips, data is time-shared based on a first signal which alternates between an H level and an L level at a 1-chip interval of the pseudo-noise code for receiving;

a second data time-sharing means for time-sharing data based on a second signal which is inversely phased in relation to the first signal and obtaining a second data time-sharing signal;

means for obtaining a delay discriminating property by subtracting the second data time-sharing signal from the first data time-sharing signal; and means for controlling the frequency of the pseudo-noise code for receiving based on the delay discriminating property and synchronously tracking the pseudo-noise code for receiving with the pseudo-noise code for transmitting.

6. A synchronous tracking apparatus of a spread spectrum receiver for receiving a signal in which data have been spread based on a pseudo-noise code for transmitting, comprising:

a first data time-sharing means wherein, in addition to phase-synchronizing with a signal obtained by receiving a signal in which data have been spread based on a pseudo-noise code for transmitting and multiplying this received signal with a pseudo-noise code for receiving, data is time-shared based on a first signal which repeats outputting at the H level and L level at 1-chip segments of the pseudo-noise code for receiving;

a second data time-sharing means for time-sharing data based on a second signal which is inversely phased in relation to the first signal and obtaining a second data time-sharing signal;

a calculating means for subtracting an output signal of the second data time-sharing means from an output signal of the first time-sharing means;

an integrating means for integrating an signal outputted from the calculating means; and a means for obtaining a delay discriminating property from a signal outputted from the integrator, controlling the frequency of the pseudo-noise code for receiving based on the delay discriminating property and synchronously tracking the pseudo-noise code for receiving with the pseudo-noise code for transmitting.

7. A synchronous tracking apparatus of a spread spectrum receiver according to any one of claims 3–6, wherein both the first and second signals are clock signals for generating pseudo-noise codes for receiving and are inversely phased.

8. A synchronous tracking apparatus of a spread spectrum receiver according to any one of claims 1–6, wherein the pseudo-noise code for receiving is created by inputting a clock signal to a linear feedback shift register.

9. A synchronous tracking apparatus of a spread spectrum receiver according to any one of claims 4, and 6, wherein both the first and the second data time-sharing means are comprised of a logical OR gate.

10. A synchronous tracking apparatus of a spread spectrum receiver according to any one of claims 4 and 6, wherein both the first data time-sharing means and the second data time sharing means are comprised of a logical NAND gate.

11. A synchronous tracking apparatus of a spread spectrum receiver for receiving a signal in which data have been spread based on a pseudo-noise code for transmitting, comprising:

means for obtaining a first correlation value and a second correlation value, including
means for multiplying a received signal spread using a pseudo-noise code for transmitting by a pseudo-noise code for receiving, and
time sharing means for sharing data from the means for multiplying with a timing signal,
wherein each correlation value has a correlation curve that is asymmetrical to a correlation value axis representing a point on the curve in which the pseudo-noise code for receiving and the pseudo-noise code for transmitting are perfectly aligned at the receiver; and means for obtaining a delay discriminating value by combining the first and second correlation values.

12. A correlator, comprising:

means for multiplying a first signal including a sequence code and a second signal including a sequence code, wherein the sequence code of the first signal is the same as the sequence code of the second signal, thus generating a multiplication output;

means for integrating using the multiplication output in order to obtain a correlation value;

wherein the correlation value has a correlation curve that is asymmetrical with respect to a correlation value axis representing a point on the curve in which the pseudo-noise code for receiving and the pseudo-noise code for transmitting are perfectly aligned at the receiver.

13. A correlator, comprising:

means for multiplying a first signal including a predetermined sequence and a second signal including the same predetermined sequence; and data time-sharing means for thinning data output from the means for multiplying in order to generate a correlation value;

wherein the correlation value has a correlation curve that is asymmetrical with respect to a correlation value axis representing a point on the curve in which the pseudo-noise code for receiving and the pseudo-noise code for transmitting are perfectly aligned at the receiver.

14. A correlator, comprising:

means for multiplying a first signal including a predetermined sequence and a second signal including the same predetermined sequence; and means for obtaining a correlation value, wherein the correlation value has a correlation curve that is asymmetrical with respect to a correlation value axis representing a point on the curve in which the pseudo-noise code for receiving and the pseudo-noise code for transmitting are perfectly aligned at the receiver, including data time-sharing means for thinning data output from the means for multiplying, and means for integrating using the output of the means for thinning.

15. A correlator, comprising:

means for multiplying a first signal including a predetermined code sequence and a second signal including the same predetermined code sequence in order to generate a multiplication output;

means for performing a logic operation using the multiplication output and a third signal phase-synchronized to either the first signal or the second signal in order to generate a logic operation output; and means for integrating the logic operation output thus generating an integration output wherein the integration output has a correlation curve that is asymmetrical with respect to a correlation value axis representing a point on the curve in which the pseudo-noise code for receiving and the pseudo-noise code for transmitting are perfectly aligned at the receiver.

16. A correlator according to any one of claims 12–15, wherein the first and second signals are pseudo-noise codes.

17. A correlator, according to any one of claims 12–15, wherein first and second signals are pseudo-noise codes obtained by inputting clock signals to a linear feedback shift register.

18. A correlator according to any one of claims 13–14, wherein an OR logic calculator is used in the data-time sharing means.

19. A correlator according to any one of claims 13–14 wherein a NAND logic calculator is used in a data time-sharing means.

20. A correlator, comprising:

means for multiplying a first signal including a predetermined sequence and a second signal including the same predetermined sequence in order to generate a multiplication result; and means for obtaining a correlation value by carrying out an integration after performing an operation with the multiplication result and a clock signal phase-synchronized to either the first signal or the second signal;

wherein the correlation value has a correlation curve that is asymmetrical with respect to a correlation value axis representing a point on the curve in which the pseudo-noise code for receiving and the pseudo-noise code for transmitting are perfectly aligned at the receiver.

21. A correlator, comprising:

means for generating a code based on a predetermined sequence;

means for multiplying the generated code and a received signal; and means for obtaining a correlation value having a correlation curve that is asymmetrical with respect to a correlation value axis by thinning and integrating data output from the means for multiplying;

wherein the correlation value axis represents a point on the curve in which the pseudo-noise code for receiving and the pseudo-noise code for transmitting are perfectly aligned at the receiver.

22. A spread spectrum receiver for receiving a transmitted signal in which data have been spread using a pseudo-noise code for transmitting and de-spreading the received signal by multiplying the received signal by a pseudo-noise code with an identical phase and an identical sequence as the pseudo-noise code for transmitting, comprising:

means for obtaining a correlation value representing a correlation between the pseudo-noise code contained in the received signal and the pseudo-noise code used for despreading, wherein the correlation value has a correlation curve that is asymmetrical with respect to a correlation value axis and the correlation value is obtained by thinning and integrating data from a multiplication result of the pseudo-noise code contained in the transmission signal and the pseudo-noise code used for de-spreading;

means for determining whether to increase or delay the phase of the pseudo-noise code for de-spreading from this asymmetry; and means for adjusting the phase of the pseudo-noise code for despreading.

* * * * *